United States Patent [19]
Kubota et al.

[11] Patent Number: 6,009,447
[45] Date of Patent: Dec. 28, 1999

[54] METHOD AND SYSTEM FOR GENERATING AND IMPLEMENTING ORIENTATIONAL FILTERS FOR REAL-TIME COMPUTER VISION APPLICATIONS

[75] Inventors: Toshiro Kubota, Columbia, S.C.; Cecil O. Alford, Lawrenceville, Ga.

[73] Assignee: Georgia Tech Research Corporation, Atlanta, Ga.

[21] Appl. No.: 08/801,602

[22] Filed: Feb. 13, 1997

Related U.S. Application Data

[60] Provisional application No. 60/011,813, Feb. 16, 1996, provisional application No. 60/011,814, Feb. 16, 1996, and provisional application No. 60/011,815, Feb. 16, 1996.

[51] Int. Cl.⁶ ..................................................... G06F 17/00
[52] U.S. Cl. ........................................... 708/313; 708/308
[58] Field of Search ........................ 364/724.1, 724.011, 364/724.17, 724.19, 572; 375/346; 382/275, 266; 340/706; 708/313, 308

[56] References Cited

U.S. PATENT DOCUMENTS

| | | | |
|---|---|---|---|
| 4,891,630 | 1/1990 | Friedman et al. | 340/706 |
| 5,519,793 | 5/1996 | Grammes | 382/266 |
| 5,526,446 | 6/1996 | Andelson et al. | 382/275 |

OTHER PUBLICATIONS

"Computation of Orientational Filters for Real–Time Computer Vision Problems I: Implementation and Methodology," Kubota, Toshiro and Alfrod, Cecil O., *Real–Time Imaging*, vol. 1, 1995 pp. 261–281.

"Computation of Orientational Filters for Real–Time Computer Vision Problems II: Multi–resolution Image Decomposition," Kubota, Toshiro and Alford, Cecil O., *Real–Time Imaging*, vol. 2, 1996, pp. 91–116.

"Computation of Orientational Filters for Real–Time Computer Vision Problems III: Steerable System and VLSI Architecture," Kubota, Toshiro and Alford, Cecil O., *Real–Time Imgaing*, vol. 3, 1997, pp. 37–58.

"Design and Implementation of Orientational Filters Using Separable Approximation Methods," Kubota, Toshiro and Alford, Cecil O. and Woods, Michael B., Proc. IEEE/SUC Int. Conf. pp. 333–338.

*Discrete Fourier Analysis of Multidimensional Signal*, Multidimensional Digital Signal Processing by Dan E. Dudgeon and Russell M. Mersereaus, Prentice–Hall, pp. 76–81 (1984).

*From Images to Surfaces*, Vision by David Marr, W.H. Freeman pp. 174–183 (1982).

"Survey of Texture Mapping", Heckbert, Paul S., *IEEE CG& A*, Nov. 1986, pp. 231–332.

(List continued on next page.)

Primary Examiner—Joseph E. Palys
Assistant Examiner—Nguyen Xuan Nguyen
Attorney, Agent, or Firm—Harness, Dickey & Pierce, P.L.C.

[57] ABSTRACT

Methods for generating and implementing digital orientational filters. A first method of the present invention is provided for generating digital orientational filters of uniform size but each having a different fixed orientation. A second method provides for dilation of the digital orientation filters generated by the first method, both in a decimated and an undecimated format. A third method of the present invention provides for steering the orientation of the filters generated by the first method. Also, associated VLSI hardware based systems implementing the above methods are disclosed. The above methods and systems allow digital orientational filters to be utilized in computer vision and other applications requiring a large amount of video signal data to be processed in real-time.

10 Claims, 21 Drawing Sheets

OTHER PUBLICATIONS

"Multirate Digital Filters, Filter Banks, Polyphase Networks, and Applications, A Tutorial," Vaidyanathan, P.P., *Proceedings of the IEEE,* vol. 78, No. 1, Jan. 1990, p. 56.

"Wavelets and Signal Processing," Rioul, Olivier and Vetterli, Martin, *IEEE SP Magazine,* Oct. 1991, pp. 14–15 adn 36–38.

*Orthonormal Bases of Wavelet,* Orthonormal Bases of Compactly Supported Wavelets by Ingrid Daubechies, COmmunication in Pure and Applied Mathematics, vol. 41, No. 7, pp. 914–923 (1988).

"Determining Three–Dimensional Shape from Orientation and Spatial Frequency Disparities," Jones, David G. and Malik, Jitendra, pp. 661–669.

"Adaptive enhancement based on a visual model," Peli, Eli, *Optical Engineering,* vol. 26, No. 7, Jul. 1987, pp. 655–660.

"Image Representation Using Block Pattern Models and Its Image Processing Applications," Wang, Yao and Mitra, Sanjit K., *IEEE Transactions on Pattern Analysis and Machine Intelligence,* vol. 15, No. 4, Apr. 1993, pp. 321–336.

"Application of Multiresolution Spatial Filters to Long–Axis Tracking," Abramson, S.B. and Fay, F.S., *IEEE Transactions on Medical Imaging,* vol. 9, No. 2, Jun. 1990, pp. 151–158.

"Parallel Processing for Computer Vision and Images Understanding," Choudhary, Alok and Ranka, Sanjay, *Computer,* Feb. 1992, pp. 7–10.

"A Real–Time Algorithm for Signal Analysis with the Help of the Wavelet Transform," Holschneider, M., Kronland–Martinet, R., Morlet, J. and Tchamitchian, Ph., pp.287–297.

"An Implementation of the 'algorithme á trous' to Compute the Wavelet Transform," Dutilleux, P., pp.298–304.

"The Design and Use of Steerable Filters," Freeman, William T. and Adelson, Edward H., *IEEE Transactions on Pattern Analysis and Machine Intelligence,* vol. 13, No. 9, Sep. 191, pp. 891–906.

"X–Y separable pyramid steerable sealable kernels," Shy, Douglas and Perona, Pietro, *IEEE,* 1994, pp. 237–245.

"Finite Representation of Deformable Kernels," Perona, Pietro, pp. 8–17.

"A New Parallel 2–D FFT Architecture," Pytosh, Teresa M., Magnani, Alberto M., *IEEE,* 1990, pp. 905–908.

"Parallel Visual Pathways: A Review," Lennie, Peter, *Vision Research,* vol. 20, pp. 561–594.

"Fast Algorithms for Discrete and Continuous Wavelet Transforms," Rioul, Oliver and Duhamel, Pierre, *IEEE Transactions on Information Theory,* vol. 38, No. 2, Mar. 1992, pp. 569–586.

"Parallel Computer Architectures for Image Processing," Reeves, Anthony P., *Computer Vision, Graphics and Image Processing,* vol. 25, 1984, pp. 68–88.

"A Theory for Multiresolution Signal Decompostion: The Wavelet Representation," Mallat, Stephane G., *IEEE Transactions on Pattern Analysis and Machine Intelligence,* vol. 11, No. 7, Jul. 1989, pp. 674–693.

"The Discrete Wavelet Transform: Wedding the Á Trous and Mallat Algorithms," Shensa, Mark, J., *IEEE Transactions on Signal Processing,* vol. 40, No. 10, Oct. 1992, pp. 2464–2482.

"Multichannel Texture Analysis Using Localized Spatial Filters," Bovik, Alan, C., Clark, Marianna, and Geisler, Wilson, S., *IEEE Transactions on Pattern Analysis and Machine Intelligence,* vol. 12, No. 1, Jan. 1990, pp. 55–73.

"A Quasi Radix–16 FFT VLSI Processor," Bhatia, R., Furuta, M. and Ponce, J., *IEEE,* 1991, pp. 1085–1088.

"Texture Analysis Based on A Human Visual Model," Tan, T.N. and Constantinides, A.G., *IEEE,* 1990, pp. 2137–2140.

"The Design of Multistage Separable Planar Filters," Treital, Sven and Shanks, John L., *IEEE Transactions on Geoscience Electronics,* vo.GE–9, No. 1, Jan. 1971, pp. 10–27.

"Unsupervised Texture Segmentation Using Gabor Filters," Jain, Anil K. and Farrokhnia, Farshid, *IEEE,* 1990, pp. 14–19.

"The Visual Cortex," Tusa, Ronald J., *Am. J. EEG Technol.* vol. 26, 1986, pp. 135–143.

"The Cortex Transform: Rapid Computation of Simulated Neural Images," Watson, Andrew B, *Computer Vision, Graphics, and Image Processing,* vol. 39, 1987, pp.311–327.

Toshiro Kobuta, Cecil O. Alford and Michael B. Woods, "Design and Implementation of Orientational Filters Using Separable Approximation Methods", Proceedings of the IEEE International Conference on Systems, Man and Cybernetics, pp. 333–338, Oct. 1993.

Gilbert Strang and Vasily Strela, "Short Wavelets and Matrix Dilation Equations", IEEE Transaction on Signal Processing, vol. 43, No. 1, pp. 108–115, Jan. 1995.

William T. Freeman and Edward H. Adelson, "The Design and Use of Steerable Filters", IEEE Transactions on Pattern and Machine Intelligence, vol. 13, No. 9, pp. 891–906, Sep. 1991.

Douglas Shy and Pietro Perona, "X–Y separable pyramid steerable scalable kernels", IEEE Computer Vision and Pattern Recognition, pp. 237–244, Jan. 1994.

D. Raghuramireddy and R. Unbehauen, "A New Realization for Microprocessor Implementation of 2–D Denominator–Separable Digital Filters for Real–Time Processing", IEEE Transactions on Signal Processing, pp. 2349–2353, Sep. 1992.

Cormaqc Herley and Martin Vetterli, "Orthogonal Time–Varying Filter Banks and Wavelets", IEEE Circuit and Systems, pp. 391–394, May 1993.

Cormac Herley and Martin Vetterli, "Orthogonal Time–Varying Filter Banks and Wavelet Packets", IEEE Transactions on Signal Processing, vol. 42, No. 10, pp. 2650–26763, Oct. 1994.

$H_k[m]$ is a horizontal filter, and $[h]$ is a vertical filter.
Structure od Seperable Approximation Scheme (a) Spline Order = 1

(b) Spline Order = 3

(c) Spline Order = 5

(d) Spline Order = 7

BAG = Reorder Buffer Address Generator
VFM = Vertical Filter Module
HFM = Horizontal Filter Module Undecimated Separable-Wavelet Approximation (Scheme II) with Multiple Orientational Filters BAG = Reorder Buffer Address Generator
VFM = Vertical Filter Module
HFM = Horizontal Filter Module
   (See Fig. NO TAG)

$q_k(\theta)$ = Interpolation Unit

The identical MRD Module can be cascaded for further MRD
a distinct set of interpolation units is needed for each orientation tuning.

Structure of Undecimated Steerable MRD

Figure - 17     VLSI Architecture of SV/OSD

Note: coeff, host_addr and chip_id signals from the host are routed to every VFC and HFC although the above figure does not show the connections to some of the chips.

VLSI Architecture of SV/OSD with $M > W_{FV}$ and $M > W_{FH}$

2D Separable Filter Chip for Pre-filter and low-pass Filter in SWA

*VLSI Architecture for Decimated SWA*

VLSI Architecture of FSA + SV/OSD

VLSI Architecture for Decimated FSA + SWA

Note: Only the first level decomposition is shown here. However, the subsequent descompositions are implemented in exactly the same way as the first level.

*VLSI Architecture for Undecimated SWA*

METHOD AND SYSTEM FOR GENERATING AND IMPLEMENTING ORIENTATIONAL FILTERS FOR REAL-TIME COMPUTER VISION APPLICATIONS

This application claims benefit or provisional applications 60/011813, filed Feb. 16, 1996 provisional application 60/011814, filed Jun. 16, 1996, and provisional application 60/011815, filed Feb. 16, 1996.

TECHNICAL FIELD

The present invention relates generally to digital filters, and particularly to digital filter generation methods and system for computer vision processing that enable vision data to be processed in real-time with minimal associated hardware costs.

DISCUSSION

In the last two decades, an immense amount of research has been conducted on how to construct a machine system which is capable of seeing and understanding a visual scene as well as humans. This problem is referred to as the computer vision problem. The problem has two major sub-problems; (1) identifying some particular object in a scene, or (2) understanding and describing all the objects in a scene. The computer vision problem may be categorized with computationally intensive problems, such as global weather modeling, fluid turbulence and molecular dynamics. The computational requirement for a vision system can be estimated by assuming that 1024×1024 pixels will be processed at a rate of 30 frames/see. Such a system must process 30 million data elements (pixels) per second. If one thousand operations have to be performed on each pixel to fulfill the goal of understanding the scene, 30 billion operations per second will be required. For most systems, the number of operations per pixel will be higher by a factor of 10 to 100 leading to an estimated requirement of computational power between 100 and 1,000 billion operations per second. To build such a system requires parallel processing and special hardware.

Another difficulty in computer vision is that the problem is not well-posed from a computational perspective. For example, a system must detect a chair from image sequences which represent dynamic views inside a room. A simple pattern matching method which compares an image with a small template representing the chair does not work, since the chair can be any size and at any orientation relative to the image frame. The chair can also be partially occluded by other objects, and obscured by lighting and signal noise. Thus, input images representing the scene must to be processed in such a way that the result produces a data representation of each object which is minimally dependent on an affine transformation, partial occlusion and noise. This representation is often expressed as a collection of characteristic called "features". Edges, corners and texture have been suggested as good features for image analysis.

A reasonable approach to the computer vision problem is to apply the human visual processing mechanism to computer vision methods. This interaction of neuro-physiological research and computer engineering not only produces better vision methods, but also helps understand the mechanism of the human visual system. However, only a small portion of human visual processing is understood. Thus, no consensus has been established on how to solve the vision problem.

In order to make the vision problem tractable, the problem is divided into three levels of processing: low, intermediate, and high. Low level processing takes pixel data as inputs and extracts primitive features such as edges, texture, depth map, and optical flow. This level of processing is mostly regular and data-independent, requiring numeric operations on huge amounts of pixel data. The intermediate level is dependent and regular, and takes the primitive features generated from low level processing and extracts more meaningful features such as surfaces and contours. The computations are often both symbolic and numeric. High level processing is highly data dependent and very diverse and interacts with the database of objects to determine types of objects in the image.

In low-level vision processing, two types of information have to be extracted from images simultaneously. One is a feature type which can be characterized well in the frequency domain. The second is the location of the feature in the spatial domain. Taking a Fourier transform of the image is not acceptable since the transform loses all the spatial information and the location of features cannot be determined. In order to extract the information from two domains, spatial-frequency analysis needs to be performed on images. Also, in order to extract features of various orientations, the spatial-frequency analysis must have directional selectivity. An operator which performs spatial-frequency analysis with directional selectivity is called an orientational filter. The operator can be performed in either the spatial domain or the frequency domain. Many such operators appear in computer vision research. Some examples are the windowed Fourier transform, Gabor filters and Gaussian derivatives.

Many filters tuned to different orientations are needed to detect features with various orientations. In order to detect features with various sizes, filters with different sizes are needed. Thus, a computer vision system must contain many filters tuned to different frequency regions in order to be flexible enough to solve different problems. Also, the implementation cost of the vision system depends heavily on the implementation cost of each filter. In order to minimize cost without losing flexibility, it is essential to be able to tune the filter to a particular frequency response dynamically from frame to frame, or even within a frame in real-time, to allow the system to be adapted to a particular problem and to changes of input images.

SUMMARY OF THE INVENTION

Figure 1:
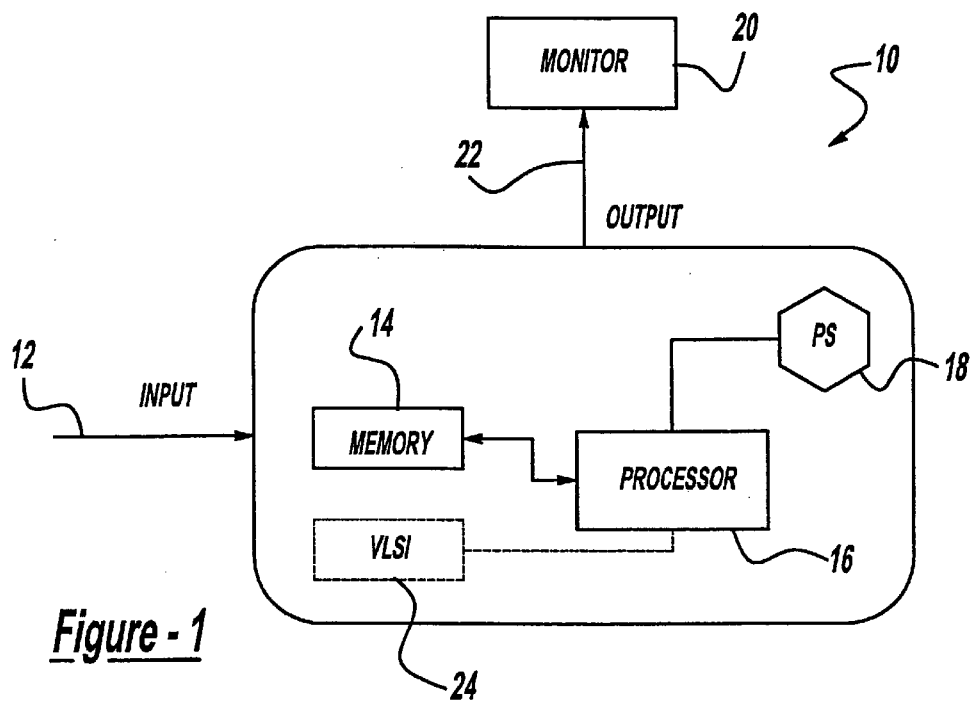
FIG. 1 is a block diagram of a computer system in which digital orientational filters generated and implemented by the method and system of the present invention are utilized.

The present invention provides an inexpensive method and implementation scheme for orientational filters suitable for real-time computer vision applications requiring processing of pixels at high throughput and producing outputs with associated low latency.

According to a first preferred embodiment of the present invention, a method of generating a plurality of digital orientational filters is provided. The method includes the steps of providing a processor for processing filter data; inputting filter parameters into the processor; computing filter coefficients from the filter parameters; generating a digital filter approximation matrix based on the filter coefficients; and decomposing the approximation matrix into a plurality of separable digital filters to filter data in real time.

According to a second preferred embodiment of the present invention, the present invention provides a method of processing video data, and includes the steps of providing a processor for processing input pixel data; inputting filter parameters into the processor; computing filtered coefficients from the filter parameters; generating a digital filter approximation matrix based on the computed coefficients; decomposing the approximation matrix into a plurality of separable filters to filter data in real time; generating a basic spline function; approximating each separable filter by basic spline function, which produces a set of low-pass and high-pass filters for an efficient recusive multi-resolution decomposition; and outputting the filtered pixel data. The method also includes the steps of increasing a dilation factor of the orientational filters by a predetermined factor; and repeating the above steps for L levels of decomposition, where L equals a positive non-zero integer.

A third preferred embodiment of the present invention includes a method for generating a plurality of steerable digital orientational filters, and includes the steps of generating a two-dimensional mother wavelet function; decomposing the mother wavelet function into a set of basis filters; and decomposing the basis filters into separable filters to control orientation of each of the plurality of filters in response to input data characteristics.

In addition, the present invention provides VLSI based hardware schemes for implementing the above methods of the present invention in a hardware minimizing and cost effective manner.

Thus, it is an object of the present invention to provide a method for generating orientational filters for real-time data processing applications that exhibits high throughput, low latency, small computational complexity and small storage criteria.

It is also an object of the present invention to provide a multi-resolution decomposition (MRD) method to produce a hierarchial image representation suitable for a variety of image processing applications.

It is a further object of the present invention to provide a method of tuning orientational digital filters dynamically in real-time while still satisfying application performance criteria.

It is another object of the present invention to provide a VLSI-based component system that implements a plurality of digital orientational filters for real-time data processing in a cost-effective manner.

DETAILED DESCRIPTION OF THE PREFERRED EMBODIMENT

Referring to FIG. 1, a computer system including digital filters generated and implemented for computer vision applications of the method and system of the present invention is shown generally at 10. The computer system 10 is of the type well known in the art used for vision based applications, such as a SUN Ultra SPARC station. In summary, the system includes a video signal input 12 and a memory 14 for storing video signal data input into the system through the input 12. The system also includes a processor 16 that is programmed to control video signal data processing in accordance with the present invention, along with a system power source 18 of the type well known in the art. The system also includes a video monitor 20, which is preferably a standard raster graphics monitor with 1,024× 1,024 pixel resolution, and which receives the processed video data from the processor via output 22. The digital orientational filters generated by the method of the present invention may be programmed through a conventional programming language into the memory 14 and utilized by the processor 16. Alternatively, the filters may be implemented through VLSI-based hardware, as indicated in phantom at 24 and as described below in detail.

To address the present invention in a constructive manner, the following filter requirements are formulated in such a way that they are independent of technology and applications, and will be referred to throughout the following description as implementation criteria.

The assumptions below are made throughout the following description:

1) Input images consist of N×N pixels and are processed in a scan line order.

2) The number of filters in the system is $F_N$.

3) For simplicity, all the filters have the same size, M×M where M≦N.

4) The critical time, $t_m$, is the longest operation time between one multiply-accumulate operation and one memory write/read operation. These two operations govern the speed of a real-time filter system in current VLSI technology.

Based on the above assumptions, the implementation criteria can be defined as the following.

1. High Throughput

The system must be capable of handling an input rate of $O(1/t_m)$ and producing outputs at the same rate. With current VLSI technology, a multiply-accumulate operation on 16-bit integers can be easily done in 30 nsec, and fast RAM can provide an access time in under 30 nsec. This implies a possible throughput of about 33 million pixels/sec in current technology.

2. Low Latency

Latency is defined as the time delay between the first input available and the output produced by this input. The requirement on system latency is to be bounded by $O(t_m NM)$. This is the best that can be done when the input stream is arriving in a scan line order, since the system requires at least M rows of data in order to perform a filter operation of size M×M.

3. Small Computational Complexity

Computational complexity is defined as the order of the total amount of computation required to complete the filtering operation for the whole image. The requirement is that the computational complexity of the system to be less than $O(F_N N^2 M^2)$. A direct implementation of the filters has a complexity of $O(F_N N^2 M^2)$. Small complexity implies that real-time performance can be achieved with less hardware.

4. Small Storage

The storage is the amount of memory in bytes required to implement the filters. A system which requires small storage is less expensive in terms of chip count, board size, and cost than a system which requires larger storage. Although commercial RAMs have become more dense and less expensive, smaller size memory chips are faster than larger size memory chips with the same technology. Thus by keeping the storage requirements smaller, a faster system can be designed with the same implementation cost. Storage requirement can easily grow large if every filter in a system requires its own storage since the number of filters in a system can be fairly large (6 different orientations, 7 different radial frequencies and 1 quadrature pair amounts to 6×7×2=84 filters). Also the storage requirement of a method to perform one orientational filter tends to measure the latency of the method. For example, suppose Method A requires O(N×N) bytes of memory to implement an orientational filter whereas Method B requires O(N) bytes of memory. It implies that Method A needs to wait for O(N×N) bytes of data before producing an output whereas Method B needs to wait for only O(N) bytes of data. Thus the latency of Method A is at least O(N×N) and the latency of Method B is at least O(N). Note that at least MN words of storage are necessary when the inputs are coming in raster order since at least M rows of data are needed to perform M×M filtering operations.

From the above, the storage requirement of the system is O(N), and is not dependent on $F_N$. As will be seen from the discussion below, the method and implementation scheme of the present invention satisfy all four implementation criteria.

Orientational Filters

Orientational filters (directional filters) are a class of filters which have a narrow angular bandwidth in the frequency domain and are used for spatial-frequency analysis. Their applicability has been demonstrated in texture analysis, texture segmentation, edge detection, contour following, shape analysis, stereo analysis, image coding, video coding, image restoration, image enhancement and motion detection. Their advantages in computer vision problems are: 1) the ability to be tuned to a certain radial frequency and orientation, and perform as a spatially localized frequency analyzer, 2) the ability to extract many image features easily, and 3) the resemblance to certain functions in the human visual system.

In computer vision problems, objects of interest vary in size and orientation relative to the image frame, and their size and orientation can change from frame to frame due to the movement of the camera or the movement of the objects. For this reason, orientational filters have to be tuned to a particular angular/radial frequency and a spatial/frequency resolution so that the analysis can be performed on multiple objects, and follow the dynamic motion of the objects.

For a computer vision system to be used in various applications, the orientational filters need to be tunable in the following four aspects-angular center frequency, radial center frequency, radial frequency bandwidth, and angular frequency bandwidth matched to particular applications and situations.

A shift between images is caused by either a small time difference or a different viewing point. Applications such as motion analysis and stereo analysis need to find a match between certain features in multiple images and compute the distance between the matched features. However if the transform does not preserve translation, the distance cannot be computed properly. Since motion analysis and stereo analysis form a core in image understanding problems, preserving image translation is essential.

The digital orientational filter generation and implementation methods and systems of the present invention meet the above-described implementation criteria, and are therefore suitable for real-time computer vision applications. The following description sets forth the details of the present invention as it relates to the following categories: I. Separable Approximation; II. Multi-Resolution Image Decomposition; III. Steerable System; and IV. System Hardware Design.

I. Separable Approximation

It should be understood that the discrete orientational filters to be approximated originate from continuous orientational functions, and the filters are derived from sampling the continuous functions using a rectangular sampling grid. Throughout the following description, h(x,y) denotes the orientational function. It is sampled at $\{(X_m, Y_n)\}$ to form a discrete orientational filter h[m,n]. The size of the discrete filter is M×M as before.

In the separable approximation method, an orientational filter h(x, y) is approximated by a linear sum of separable filters as $$h(x, y) \approx \sum_{i=1}^{P} a_i(x) b_i(y)$$

Figure 2:
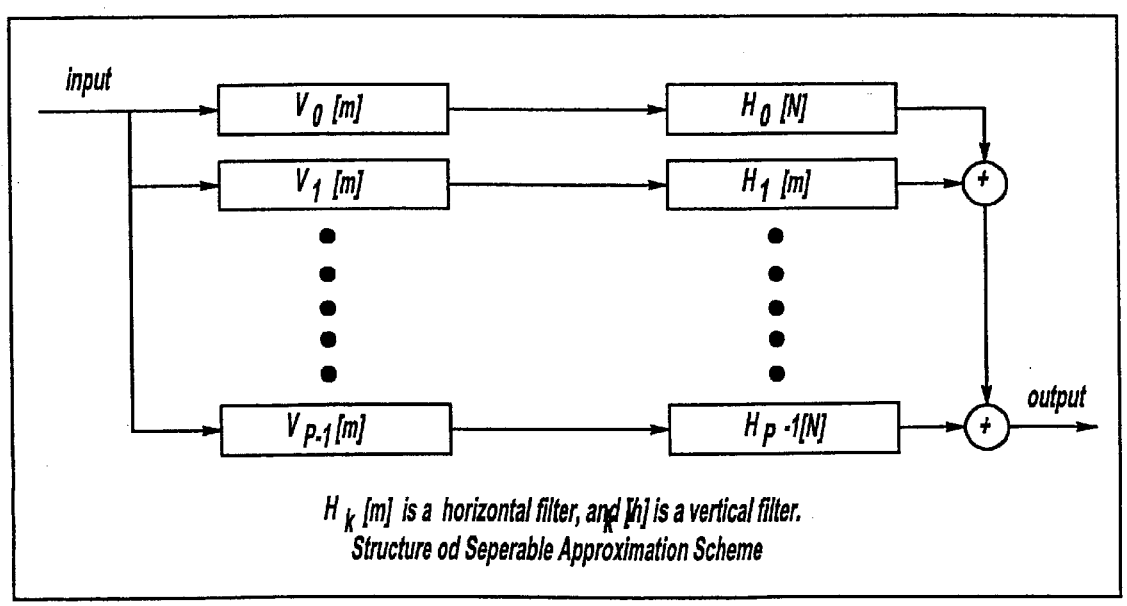
FIG. 2 is a block diagram illustrating the structure of a separable approximation scheme.

In this form, the orientational filter can be implemented by P banks of separable filters operating in parallel followed by accumulators as shown at 30 in FIG. 2. The separable approximation method enables fast operation of the filter and reduces the hardware complexity significantly. The separable approximation method of the present invention is a synthesis of two known approximation methods: Singular Value Decomposition (SVD) and Orthogonal Sequence Decomposition (OSD), and will be referred to throughout as Singlular Value/Orthogonal Sequence Decomposition (SV/OSD).

SV/OSD

The SVD method has an advantage in its approximation performance and a disadvantage in its implementation, while the reverse is true for OSD. Hence there are two approaches to improve the separable approximation method. The first one is to improve the implementation of SVD by adapting the implementation structure of OSD. The other is to improve the performance of OSD by obtaining the set of orthogonal sequences which provides the best fit to a given set of orientational filters to be approximated. It will be shown that these two approaches produce the separable approximation method of the present invention, which will now be described.

A set of orientational filters $\{h_k(x,y)\}$ ($0 \leq k < F_N$) is approximated, where each filter is represented as an FIR filter of the size M×M. Typically, $\{h_k(x,y)\}$ is generated from the same prototype filter with different orientations. The orientational filters are combined to form a M×MF$_N$ matrix A as shown at 32 in FIG. 3. The matrix A is called an approximation matrix. A set of M adjacent columns from column kM () through column (k+1)M−1 constitutes the orientational filter $h_k$. SVD is performed on the approximation matrix to produce $r_A$ vectors of length M, $r_A$ vectors of the length (MF$_N$) and the corresponding eigenvalues. The first set of vectors are denoted $u_i$ ($0 \leq i < r_A$), the second set of vectors are denoted $v_i$ ($0 \leq i < r_A$), and the square root of the eigenvalues are denoted as $w_{ii}$. Then $h_k$ can be expressed by the separable form, $$h_k[m, n] = \sum_{i}^{r_A} w_{ii} \bar{u}_m \bar{v}_{kM+n}.$$

Assume the weights, $w_{ii}$, are sorted by magnitude in descending order, and the corresponding vectors, $u_i$ and $v_i$, are shuffled in correspondence with $w_{ii}$ so that the decomposition $h_x[m,n]$ still holds. Then the $p^{TH}$ order separable approximation is:

$$h_k[m, n] \approx \sum_{i}^{P} w_{ii} \bar{u}_m \bar{v}_{kM+n}.$$

Since the $u_i$ are orthogonal vectors, and are common to all the orientational filters to be approximated, it is an OSD, although the vectors are generated from SVD. Hence this separable approximation method accomplishes the advantages of both SVD and OSD; it has the good approximation performance of SVD and the simple implementation of OSD.

The error $\epsilon_A$ introduced by the approximation is measured as a sum of approximation errors in a least squares sense, $$\varepsilon_A = \sum_{k=1}^{F_N} \sum_{m,n} \left\{ h_k[m, n] - \sum_{i=0}^{P} w_{ii} \bar{u}_m \bar{v}_{kM+n} \right\}^2 = \sum_{i=P+1}^{r_A} w_{ii}^2.$$

In this sense, $u_i$ are the optimum orthogonal sequences for approximating $\{h_k\}$. Since this algorithm is a combination of SVD and OSD, it is denoted as SV/OSD.

Convergence of Approximation

A normalized energy error for an approximation order P is at most for SVD and SV/OSD. A normalized energy error for an approximation order P is $$\varepsilon_P^2 = \frac{\sum_{i=P+1}^{M} w_{ii}}{\sum_{i=1}^{M} w_{ii}}.$$

By choosing the P largest eigenvalues ($w_{ii}$) for the approximation, the worst case is when all the eigenvalues have the same magnitude. In the case, the normalized energy error is $$\bar{\varepsilon}_P^2 = \frac{M - P}{M}.$$

Figure 3:
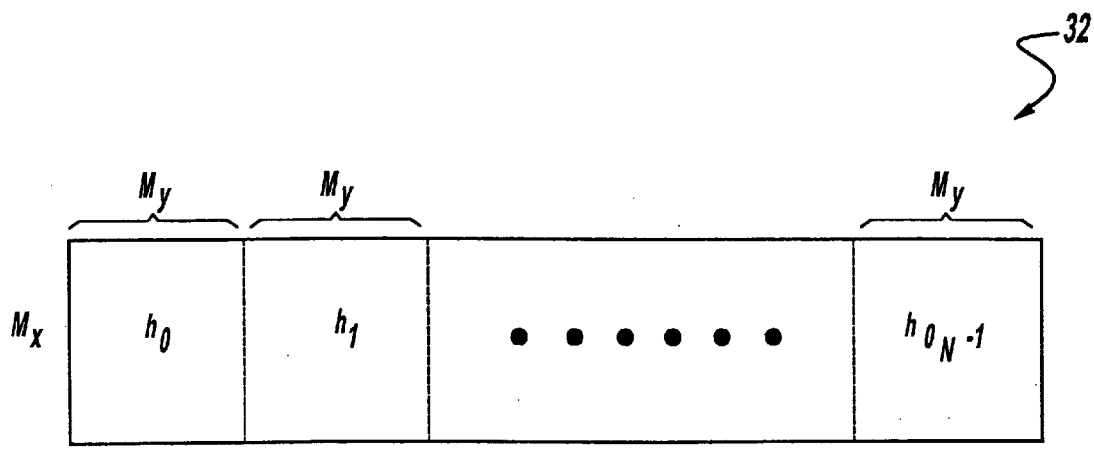
FIG. 3 illustrates the construction of an approximation matrix with multiple orientational filters.
Figure 6A:
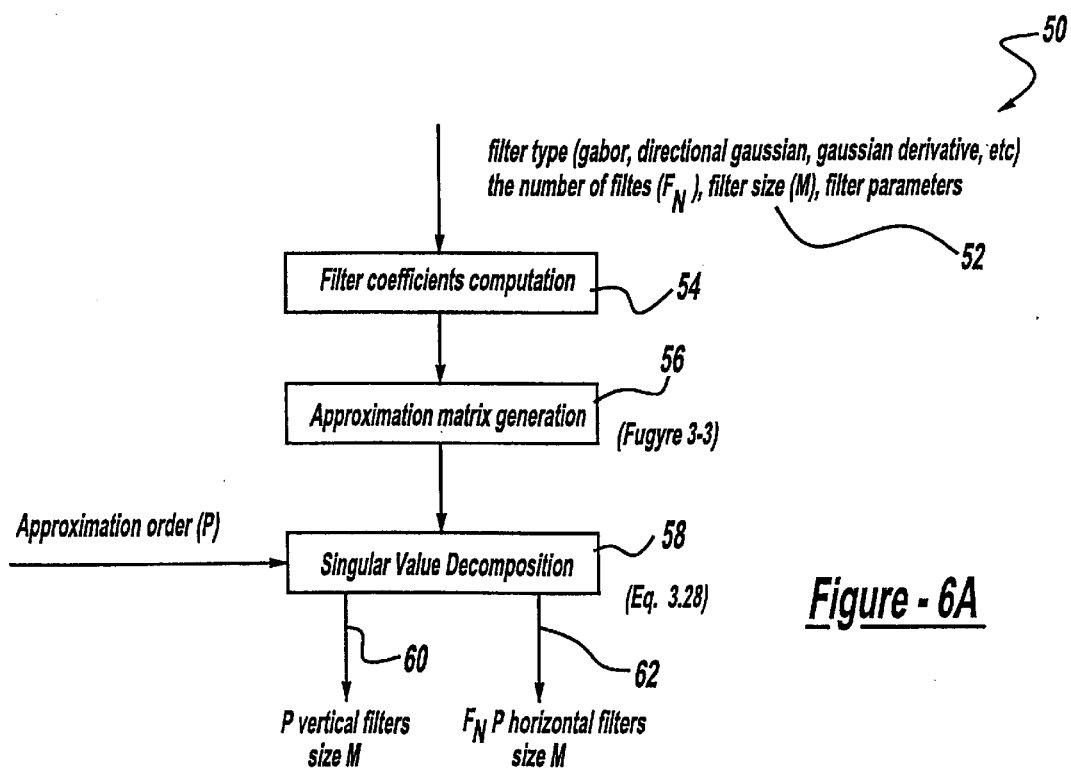
FIG. 6A is a flow diagram of the methodology associated with the filter generation scheme of the present invention.

Referring to FIG. 6A, the methodology for generating digital orientational filters according to the separable approximation method of the present invention is shown generally at 50. At step 52, filter parameters, such as filter type, number of filters required (F$_N$), filter size (M×M), and other filter parameters that may vary according to a particular filter application are input into the processor. At step 54, filter coefficients are computed through use of the above filter parameters. At step 56, an approximation matrix, as shown in FIG. 3 is generated. The filter approximation order (P) is then input at step 58 and SVD is performed on the matrix to generate a set of ID filters with optimal orthogonal coefficients based on SVD performance characteristics. As a result, P vertical filters are output at step 60. Correspondingly, F$_N$P horizontal filters are output at step 62.

Figure 6B:
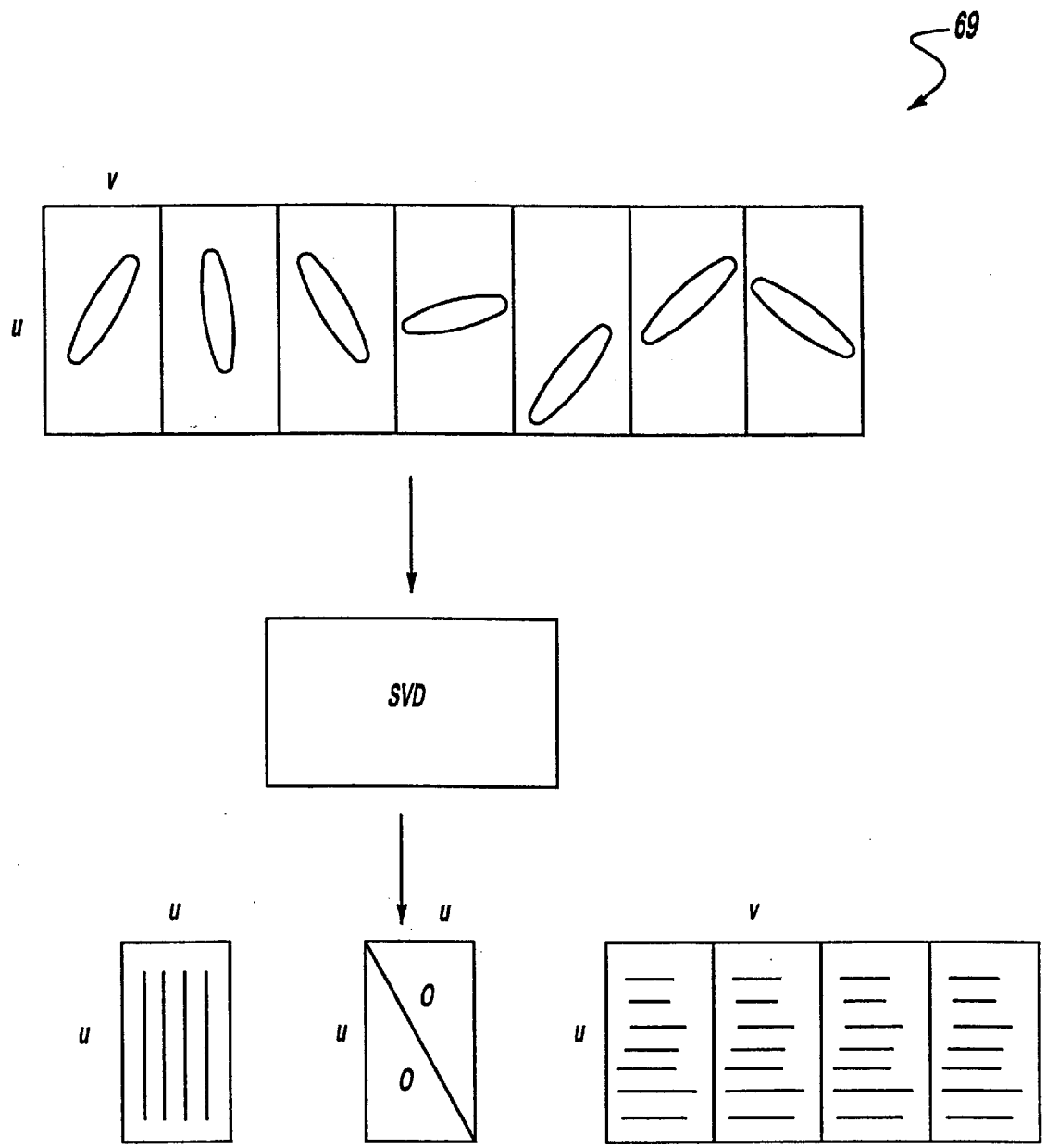
FIG. 6B is a block schematic diagram illustrating filters generated by the method of FIG. 6A.

FIG. 6B illustrates the generation of digital filters as shown generally at 70.

It should be appreciated that there is no guaranteed upper error bound for OSD. The approximation may not converge to the function being approximated if the function does not reside in the sub-space spanned by the set of orthogonal functions used for the approximation.

Implementation Scheme for SV/OSD

As described above, SV/OSD possesses good approximation performance good implementation characteristics, and good convergence behavior. There are two possible schemes to implement 1D spatial filtering. They are called pipelined filtering and parallel filtering. Pipelined filtering takes one input at a time sequentially. The input is multiplied with all the filter coefficients at the same time, and each result of multiplication is accumulated at an accumulator attached to the multiplication unit. All the accumulators are connected together through delay units, and the output of the last accumulator in the chain is the output of the filter. Parallel filtering takes M inputs at a time, and each input is multiplied with a corresponding filter coefficient. The results of the multiplications are added through the binary tree adder to form the output. Both schemes require M multipliers and M−1 adders. Pipelined filtering is suitable for a sequential input stream, and parallel filtering is suitable for a parallel input stream. For SV/OSD, pipelined filtering is suitable for horizontal filtering since the input is coming sequentially in a raster order, and parallel filtering is suitable for vertical filtering since the input can be provided in parallel so that the latency of the system reduces to O(NM). It is important to note that the parallel filtering requires an input buffer so that M parallel inputs can be provided to the filter unit simultaneously.

Figure 4:
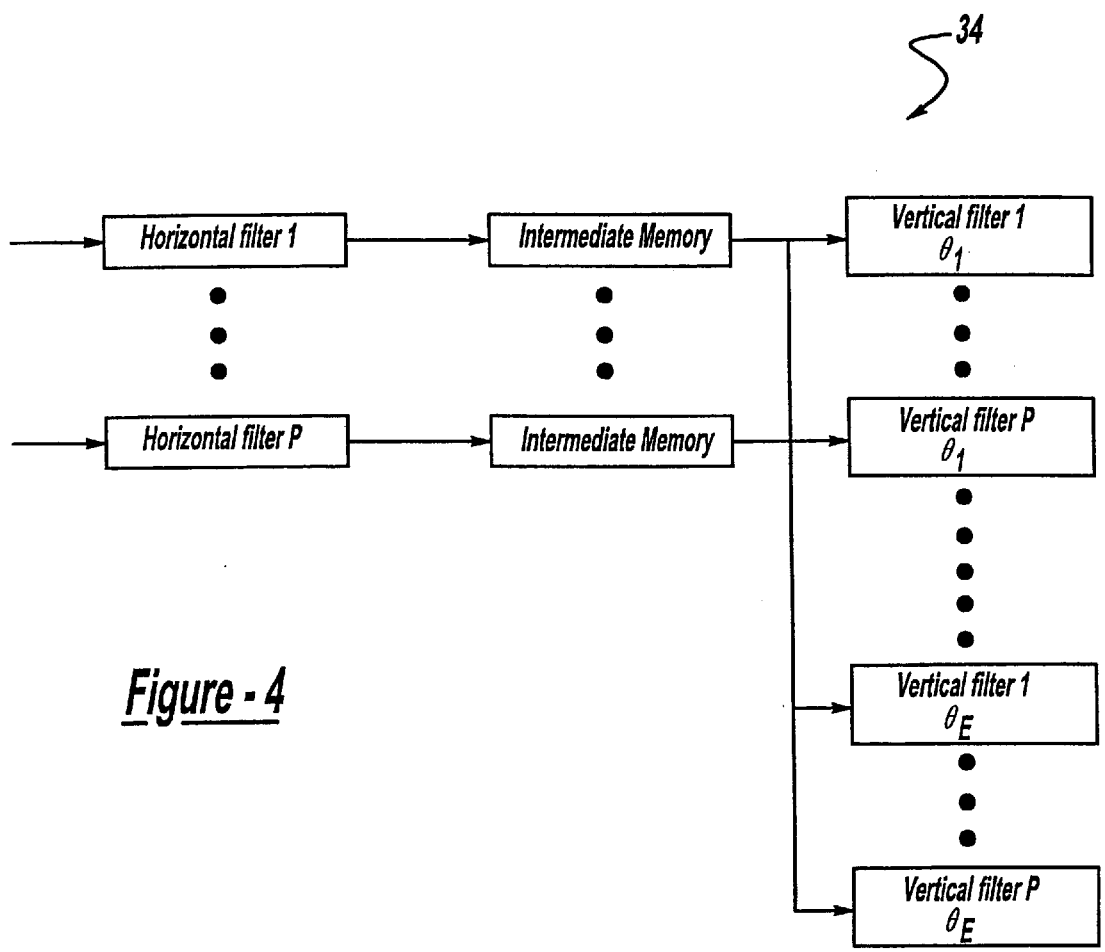
FIG. 4 illustrates a first digital filter implementation scheme.

A point very influential to the structure of the filter system is the order of filtering. Separable filtering can be done in either the horizontal-vertical order or the vertical-horizontal order. As shown at 34 in FIG. 4, with the horizontal-vertical order, the system requires an intermediate memory of size NM after each horizontal filter, thus requiring a total of NMP words of memory. As shown at 36 in FIG. 5, with the vertical-horizontal order, the intermediate memory can be shared among the vertical filters because the inputs to the vertical filters are identical. Thus the system requires a total of NM words of memory. The amount of intermediate memory needed is NM no matter how many orientational filters are to be implemented.

It should be noted that the orthogonal filters are implemented as horizontal filters and the projection filters are implemented as vertical filters in the horizontal-vertical filtering scheme. On the other hand, the orthogonal filters are implemented as vertical filters and the projection filters are implemented as horizontal filters in vertical-horizontal filtering scheme.

Figure 5:
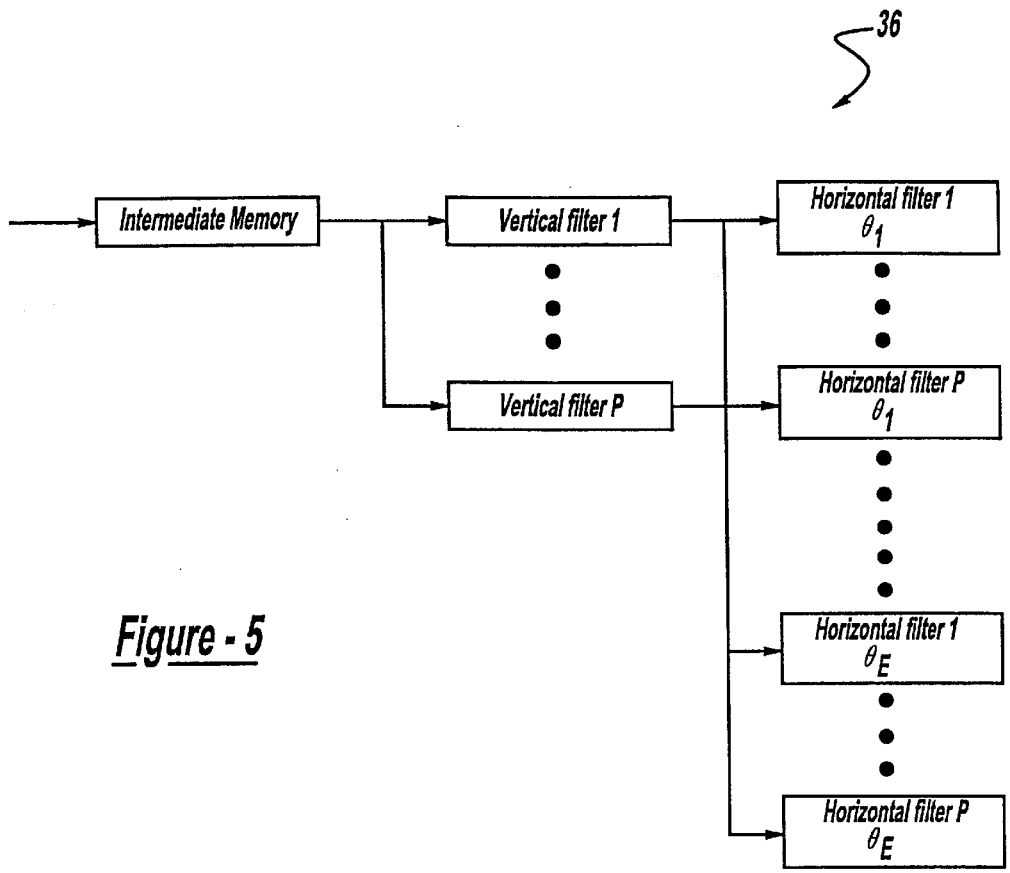
FIG. 5 illustrates a second digital filter implementation scheme.

Because of the memory requirement advantage the vertical-horizontal filtering scheme possesses over the horizontal-vertical filtering scheme, the vertical-horizontal filtering is employed to implement SV/OSD, as shown at 36 in FIG. 5.

As discussed above, the approximation converges at least linearly to the original filter as the approximation order approaches M. Thus, even for the worst case, the computational complexity of the filters using the SV/OSD is only slightly more than the complexity of the direct method and is close to 1 for large $F_N$. However, the experimental convergence and speed of SV/OSD is much faster than linear convergence in most cases, and sufficient approximation for computer vision applications can be achieved with a much smaller approximation order than M. Thus, SV/OSD satisfies all the implementation criteria. Also, the computational advantage of SV/OSD increases as the number of filters in the system increases.

II. Multi-Resolution Image Decomposition

The present invention also provides a multi-resolution image decomposition (MRD) method that produces multiple filtered output images. Each output represents the contents of an input image over a certain frequency region. The output image corresponding to a lower frequency region has a lower resolution and can be decimated (decimated MRD). Hence, the multiple output images have a pyramid structure wherein the lowest frequency plane is the smallest and the size increases as the frequency band associated with the image increases.

Thus, multi-resolution image decomposition is suitable for an image analysis platform for the following reasons. First, the objects to be recognized often have very different sizes. Hence it is impossible to define the optimal resolution for all the Second, the objects can be recognized easily if the context of the image is known. For example, if a house is recognized first, then it is easy to find a window as a rectangle inside the house. But it is more difficult to recognize the window if the house is not recognized first. Using the multi-resolution technique, it is easy to first process the coarse image to understand the context of the original image and then move to finer images for further processing. (coarse-to-fine processing). Third, coarse-to-fine processing can speed up processing since the coarse information can be represented by fewer samples. The finer details require more samples, but the prior information derived from the context, constrains the region of observation. Moreover, if an object can be recognized from a coarse description, then processing finer details is not needed. In addition, decomposing an image into different frequency bands is useful in analyzing the image. For example, an edge consists of higher frequencies while most texture information has its energy concentrated in narrow frequency bands.

The following discusses multi-resolution decomposition computation applied to MRD in both decimated and undecimated formats. The discussion is based on wavelets because the time-frequency characteristic of the wavelet transform is suitable for image analysis. More specifically, decimated MRD is described in terms of a Wavelet Series (WS) defined by $$d^k_{m,n} = \sum_{ij} f[i,j] 2^{-k+1} \psi(2^{-k+1}i - m, 2^{-k+1}j - n) = \sum_{ij} f[i,j] \psi^{k-1}(i - 2^{k-1}m, j - 2^{k-1}n)$$

where $d^k_{m,n}$ is the $k^{th}$ decomposition output at location (m,n), f[i,j] is the input signal, $\psi(x)$ is the orientational filter, and $\psi^k(x) = 2^{-k/2}\psi(2^{-k}x)$. It is assumed that the sampling period of f[m,n] is 1 in both directions for simplicity. For general sampling, $\psi^k(m,n)$ has to be replaced by $\psi^k(mT_x, nT_y)$ where $T_x$ and $T_y$ are sampling periods in the x direction and y directions respectively.

The formula for undecimated MRD is $$d^k_{m,n} = \sum_{i,j} f[i,j] 2^{-k+1} \psi(2^{-k+1}i - 2^{-k+1}m, 2^{-k+1}j - 2^{-k+1}n).$$

The decimated MRD involves decimation by 2 in both directions. Thus, the size of the image decreases by 2×2 from one level of the decomposition to the next level. The first level decomposition requires $N^2$ convolutions with each convolution having a complexity $O(M^2)$. Hence the total complexity of the first level decomposition is $O(N^2M^2)$. Similarly the $k^{th}$ level of decomposition requires $N^2/4^{k-1}$ convolutions. Each convolution at this level has a complexity $O(4^{k-1}M^2)$ due to the dilation of the filter. Hence the total complexity of the $k^{th}$ level decomposition is $O(N^2M^2)$. Now if the decomposition is performed up to the $L^{th}$ level, the complexity of the whole decomposition is $O(LN^2M^2)$. The discrete wavelet transform (DWT) performs MRD in a recursive fashion. The $k^{th}$ level decomposition is performed on the k−1$^{th}$ decomposition using the same filter kernel. This recursive scheme is possible when the wavelets are orthogonal to each other. With DWT, the decomposition can be done in $O(N^2M^2)$ and is independent of L. Then at the $k^{th}$ level of decomposition, the complexity is $O(N^2M^2/4^{k-1})$. Thus, the total amount of the computation is $$\sum_{k=1}^{L} N^2 M^2 / 4^{k-1} \leq \frac{4}{3} N^2 M^2$$

An approximation method that will be referred to as The Wavelet Approximation approximates 1D continuous wavelets in a manner that enables application of DWT even though the wavelets are not orthogonal. The Wavelet Approximation can be extended to 2D continuous wavelets by first decomposing the wavelets using Separable Approximation and applying Wavelet Approximation to each 1D filter separately. A new approximation method according to a preferred embodiment of the present invention is the Separable Wavelet approximation (SWA), and will be discussed in detail below.

For undecimated MRD, the size of the image stays the same, whereas the size of the filter increases by 2×2. Thus the amount of computation increases exponentially as the decomposition level increases. For the level L MRD, the total computation is $$\sum_{k=1}^{L} 4^{k-1} N^2 M^2 = (4^L - 1) N^2 M^2 / 3$$

Thus, the computational complexity of undecimated MRD is $O(4^L N^2 M^2)$.

The description below first describes the Discrete Wavelet Transform (DWT) which computes a decimated 1D MRD efficiently. Second, it introduces the Wavelet Approximation. Third, it introduces SWA. Fourth, it discusses implementation issues for undecimated MRD, and suggests an efficient computation scheme based on SWA.

Discrete Wavelet Transform

A wavelet series is defined by a set of wavelet coefficients $\{d_m^k\}$, where $$d_m^k = \int f(x) \sqrt{2^{-k}} \, \psi_a(m - 2^{-k} x) dx$$

Although wavelet series decomposition can be done directly to each subspace $W_k$ through implementation of the above equation, a more efficient way is to use recursion. The first decomposition divides $V_o$ into two sub-spaces, $V_1$ and $W_1$. The second decomposition divides $V_1$ into two sub-spaces, $V_2$ and $W_2$. The kth decomposition divides $V_{k-1}$ into $V_k$ and $W_k$. If an input is given as a continuous function (), it is mapped to a discrete sequence $c_m^0$ by $$c_m^0 = \int f(x) \phi_s(x - m) dx$$

If the input is given in discrete form (f[m]), the DWT can then be performed in the discrete domain as is well known in the art.

Wavelet Approximation

The wavelet approximation method allows the wavelet series to be computed in a recursive fashion, the same way as the DWT even though the wavelets are not orthonormal to each other. A mother function of dyadic wavelets is denoted as $\psi_b(X)$. The continuous wavelets are approximated by $$\Psi_b(x) \approx \sum_i \bar{g}(i) \phi_I(x - i)$$

As the wavelet is dilated, the discrete filter also expands with zeros being padded between each filter coefficient. This suggests that a dilation operation at each level of decomposition can be moved prior to the discrete filter due to an operator identity $$D^n G(Z^n) = G(z) D^n$$

where $D^K$ is decimation by K, and $G(z)$ is a z-transformed representation of a discrete filter. It also shows that the wavelets $\psi_b^k(x)$ can be implemented in a cascaded fashion with two filters, $g[m]$ and $\phi_I^k(x)$. The mother wavelet decays as $t \to \infty$ and can be truncated at some time point in the above approximation. The sequence is derived in such a way that the Wavelet approximation is exact at integer time points within the truncation points.

Once the wavelet approximation is obtained, the wavelet decomposition for $k \geq b$ 1can be recursively performed. The low pass sequence is decimated by 2 at each decomposition. However, the high pass sequence is not decimated. Thus the decomposition is not critically sampled. A basic spline function is often used as the interpolation function, $\phi_I(x)$. With the basic spline of order k, the discrete filter $\bar{h}[n]$ becomes $$\bar{h}[n] = 2^{-k-1/2} \binom{k+1}{n}$$

There are no constraints on the mother wavelet, $\psi(x)$. The method works for any function as long as a sufficient approximation of the wavelet is done through the spline function.

Separable Wavelet Approximation

Most of the notations and approximations are 2D extensions of ones in the previous section. First a 2D mother wavelet $y_b(x,y)$ is decomposed into a separable form using SV/OSD, $$\psi_b(x, y) = \sum_i^P a_i(x) b_i(y).$$

Then each 1D function is approximated by the basic spline.

$$a_i(x) \approx \sum_j g_i^x[j] \phi_I(x - j) \text{ and } b_i(y) \approx \sum_j g_i^y[j] \phi_I(y - j).$$

Following the development in Section 3.2, the decomposition can be done in a recursive fashion using discrete filters $\bar{h}[m]$, $g_i^x[m]$ and $g_i^y[m]$.

$$d_{m,n}^k = \sum_{i_x,i_y} f[i_x, i_y]\psi_b^{k-1}(i_x - 2^{k-1}m, i_y - 2^{k-1}n)$$

$$= \sum_{i_x,i_y} f[i_x, i_y]2^{-k+1}\psi_b(2^{-k+1}i_x - m, 2^{-k+1}i_y - n)$$

$$\approx \sum_{i_x,i_y} f[i_x, i_y]2^{-k+1}\sum_l a_l(2^{-k+1}i_x - m)b_l(2^{-k+1}i_y - n)$$

$$\approx \sum_{i_x,i_y} f[i_x, i_y]2^{-k+1}\sum_l \left\{\sum_{j_x} g_l^x[j_x]\phi_l(2^{-k+1}i_x - m - j_x)\right\}$$

$$\left\{\sum_{j_y} g_l^y[j_y]\phi_l(2^{-k+1}i_y - n - j_y)\right\}$$

$$= \sum_l \sum_{j_x} g_l^x[j_x - m]\sum_{j_y} g_l^y[j_y - n]c_{j_x,j_y}^{k-1}, \text{ where}$$

$$c_{m,n}^k = \sum_{i_x,i_y} f[i_x, i_y]\phi_l^k(i_x - 2^k m)\phi_l^k(i_y - 2^k n)$$

$$= \sum_{i_x,i_y} f[i_x, i_y]2^{-k}\phi_l(2^{-k}i_x - m)\phi_l(2^{-k}i_y - n)$$

$$= \sum_{i_x,i_y} f[i_x, i_y]2^{-k}\left\{\sqrt{2}\sum_{j_x} \bar{h}[j_x]\phi_l(2^{-k+1}i_x - 2m - j_x)\right\}$$

$$\left\{\sqrt{2}\sum_{j_y} \bar{h}[j_y]\phi_l(2^{-k+1}i_y - 2n - j_y)\right\}$$

$$= \sum_{j_x} \bar{h}[j_x - 2m]\sum_{j_y} \bar{h}[j_y - 2n]\sum_{i_x,i_y} f[i_x, i_y]\phi_l^k$$

$$(i_x - 2^{k-1}j_x)\phi_l^k(i_y - 2^{k-1}j_y)$$

$$= \sum_l \sum_{j_x} \bar{h}[j_x - 2m]\sum_{j_y} \bar{h}[j_y - 2n]c_{j_x,j_y}^{k-1}, \text{ with}$$

$$c_{m,n}^0 = \sum_{i_x,i_y} f[i_x, i_y]\phi_l(m - i_x)\phi_l(n - i_y)$$

The level k decomposition is performed on a decimated k–1 level decomposition, namely $c^{k-1}$. The low pass part of the decomposition above is merely a separable 2D filtering by the same filter in both dimensions. The prefiltering part of the decomposition is also a separable 2D filtering by the interpolation filter.

Figure 7A:
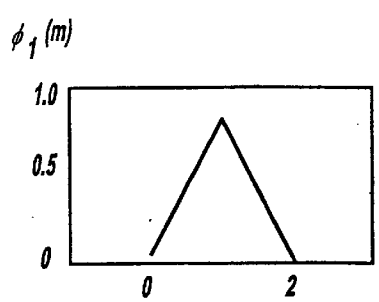
FIGS. 7A–7H illustrate interpolation functions and corresponding filters generated through a multi-resolution decomposition method according to a preferred embodiment of the present invention.
Figure 7E:
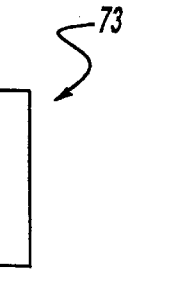
Figure 7B:
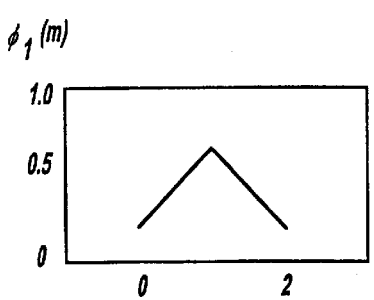
Figure 7F:
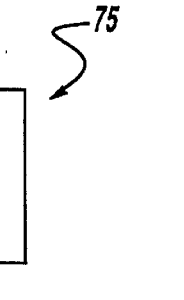
Figure 7C:
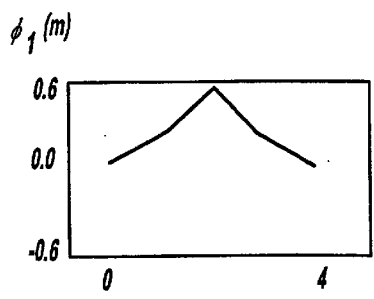
Figure 7G:
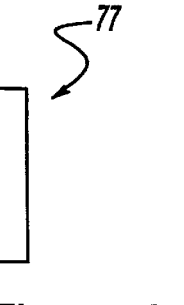
Figure 7D:
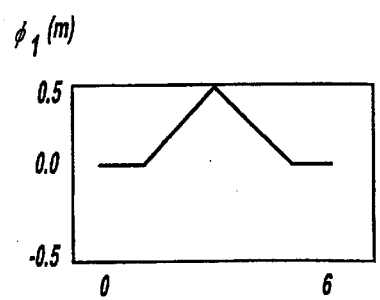
Figure 7H:
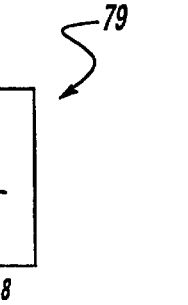
Figure 8:
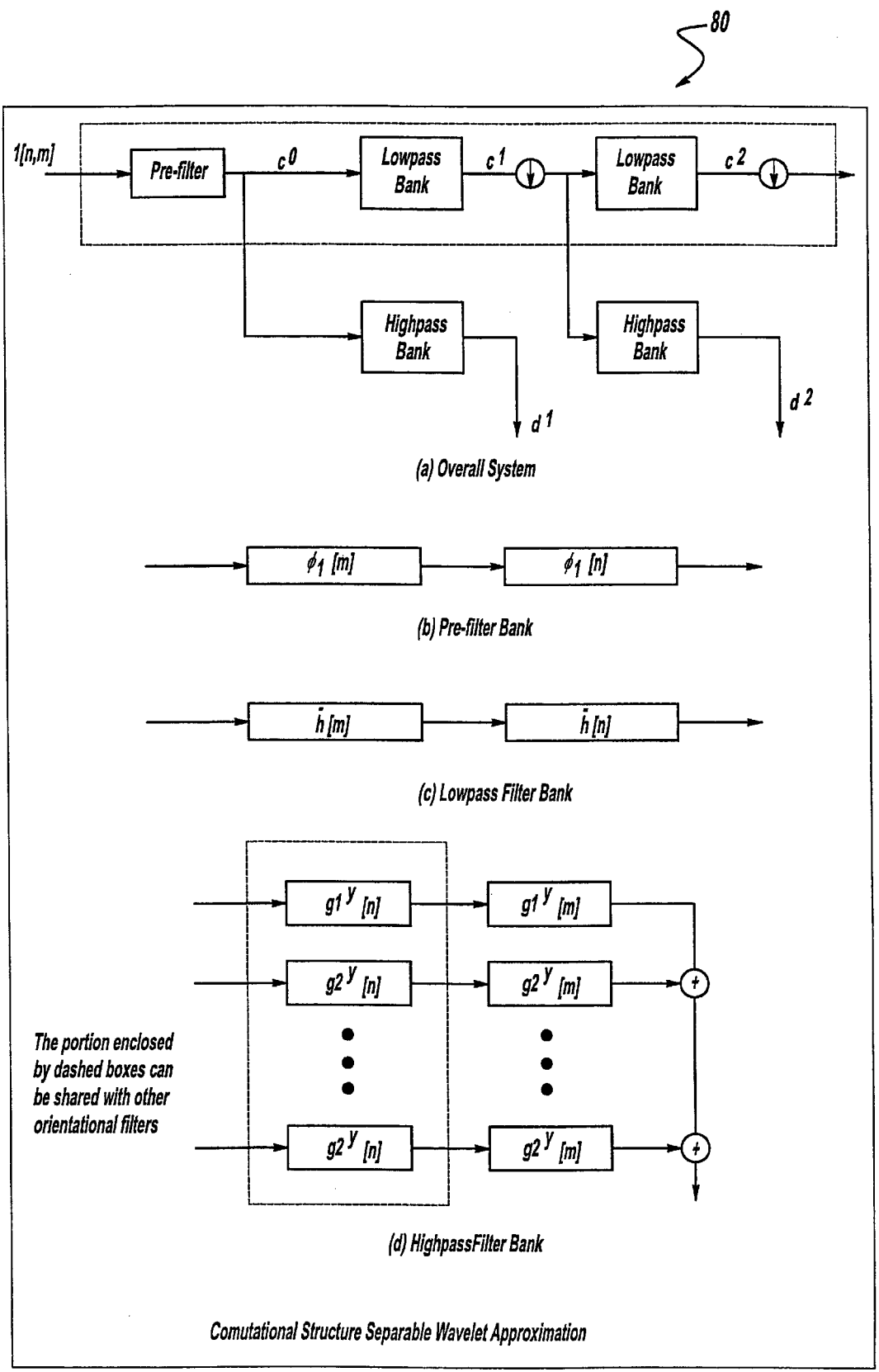
FIG. 8 is a block diagram illustrating the computational structure of the separable wavelet approximation method for decimated multi-resolution decomposition (MRD) according to the present invention.

Plots of $\phi_m$ and $\bar{h}[m]$ for spline orders of 1, 3, 5, and 7 are shown generally at 70 in FIGS. 7A–7H. The first order spline is shown at 72 in FIG. 7A, and the low-pass filter shown at 73 in FIG. 7E is generated by the equation $\bar{h}[n]$ above, with k=1. However, as the spline order increases, shown at 74, 76 and 78, in FIGS. 7B, 7C, and 7D, respectively, the resultant filters shown at 75, 77 and 79 in FIGS. 7F, 7G and 7H, respectively approach a uniform Gaussian distribution, thereby causing the filter to produce a smoother approximation. The high pass part of the decomposition uses a filter bank structure to implement the separable approximation. It contains a set of separable filters with $g_k^x[m]$ for the orthogonal direction and $g_k^y[m]$ for the projection direction. FIG. 8 shows the structure of SWA at 80. There can be multiple high-pass banks for a system with multiple orientational filters. In that case, the same pre-filter stage and the low-pass bank can be shared among the multiple high-pass filter banks. Also the set of orthogonal filters, can be shared among the multiple orientational filters when SV/OSD is used for Separable Approximation.

Benefits of SWA are examined in terms of the implementation criteria. Assume the size of h is $M_h$, and the size of the spline filter $\phi$ is $M_f$. Since the decomposition can be implemented in a pipeline fashion as shown in FIG. 8, and every filter is separable, the throughput can be as small as $1/t_m$. Thus, the SWA satisfies the first implementation criterion.

As soon as the pre-filtering stage starts generating outputs, the first stage decomposition can proceed. Also the $k^{th}$ level of the decomposition can proceed as soon as the $c^{k-1}$ is generated. Thus, the whole filter system operates in a pipeline fashion. The latency at the pre-filter is $NM_f t_m$. The pixel input rate decreases by ¼ from one level to the next level because of the decimation at each stage. This implies that the latency increases at each stage since it takes more time to collect necessary pixels. The input rate at the $k^{th}$ level decomposition is $4^{t-1} t_m$. Also the size of the output image decreases by 2 in each dimension. Thus, the latency of the low pass filter bank at the $k^{th}$ level decomposition is $(N/2^{k-1})M_h(4^{k-1}t_m) = 2^{k-1}NM_h t_m$, and the latency of the high pass filter bank at the $L^{th}$ level is $2^{L-1}NM$. The total latency of the $L^{th}$ level decomposition is approximately $$NM_l t_m + \sum_{k=1}^{L-1} 2^{k-1} NM_h t_m + 2^{L-1} NM t_m =$$

$$Nt_m\{M_l + (2^{L-1} - 1)M_h + 2^{L-1} M\} \approx 2^{L-1} N(M_h + M) t_m$$

with $M \approx M_h$. Note that $M_I=5$ and $M_h=7$ when the 5th order basic spline is used for the wavelet approximation. If the $L^{th}$ level decomposition is done directly using a dilated filter whose size is $2^{L-1}M \times 2^{L-1}M$, the latency in this case is also $O(2^{L-1}t_m NM)$. Therefore, the SWA satisfies the second implementation criterion.

The direct implementation requires computation of $O(F_N LN^2 M)$. When SWA is employed, the first level of decomposition requires $2N^2 M_I$ multiply-accumulate operations (macs) for pre-filtering, $2N^2 M_h$ macs for low-pass filtering, $N^2 PM$ macs for vertical filtering in the high-pass banks, and $F_N N^2 PM$ macs for horizontal filtering in the high-pass banks. The second level of the decomposition requires $N^2 M_h/4$ macs for low-pass filtering, $PN^2 M/4$ macs for horizontal filtering in the high-pass banks, and $F_N N^2 PM/4$ macs for vertical filtering in the high-pass banks. Thus, the whole decomposition requires $2N^2 M_I$ macs for pre-filtering, $4N^2 M_h/3$ macs for low-pass filtering, $4PN^2 M/3$ macs for vertical filtering in the high-pass banks, and $4F_N N^2 PM/3$ macs for horizontal filtering in the high-pass banks. Horizontal filtering in the high-pass banks dominates the complexity of the computation. Therefore the amount of the computation for the decomposition is $4F_N N^2 PM/3$. The computation increases only slightly from single-resolution to multi-resolution decomposition, and is much less than the direct method. The SWA satisfies the third implementation criterion.

The pre-filtering stage requires $NM_I$ words of memory. At the $k^{th}$ level of the decomposition, the size of the input image to the filter banks (i.e. $c^{k-1}$) is $2^{k-1}N \times 2^{k-1}N$ due to the decimation. Thus, at the $k^{th}$ stage, the low-pass filter bank requires $NM_h/2^k$ words of memory and the high pass filter bank stage requires $NM/2^{k-1}$ words of memory. Both the low-pass and high-pass filter access the same part of the input image, thus the input buffer can be shared. Assume $M>M_h$. Then only $NM/2^{k-1}$ words of memory are required instead of $NM/2^{k-1} + NM_h/2^{k-1}$. The total storage required is $$NM_l + \sum_{k=1}^{L} N(M + M_h)/2^{k-1} < N(M_l + 2M + 2M_h)$$

This quantity is independent of $F_N$ and $O(N)$, and the approximation satisfies the fourth implementation criterion regarding small storage requirements.

Another benefit of SWA is that a large part of the decomposition structure can be shared with other decomposition structures associated with different orientational filters. In FIG. 8, the portion which can be shared with different orientational filters is enclosed in dashed boxes.

Undecimated Separable Wavelet Approximation

The decimation at each level of the SWA plays an essential role in efficient decomposition. However, in some applications, it is preferred to have the decomposition without decimation. This is common for image analysis applications since the decimation introduces aliasing and causes the transformation to be shift invariant. This section examines how to produce an undecimated MRD without losing computational and implementational advantages of the SWA.

Figure 9:
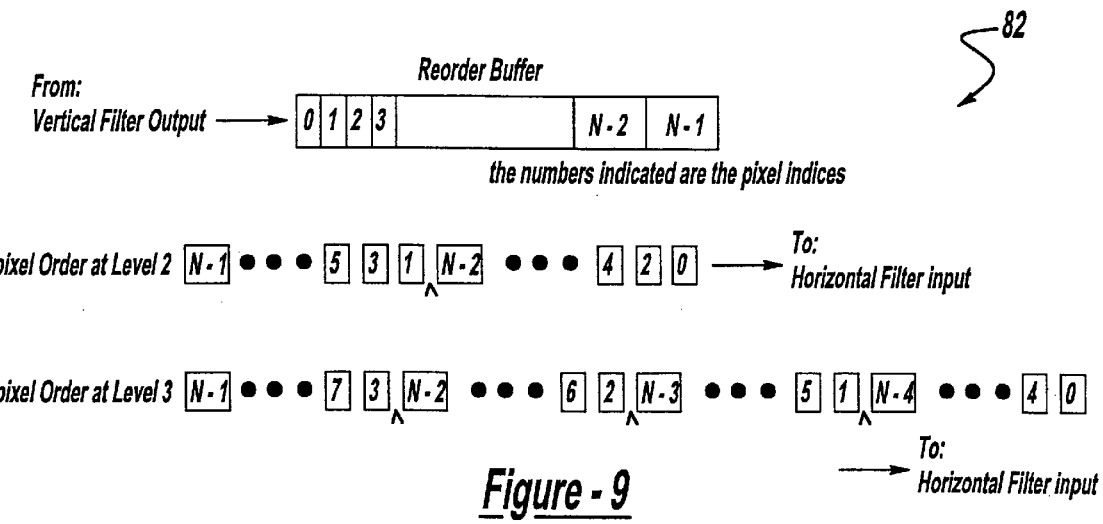
FIG. 9 illustrates a reorder buffer utilized for undecimated MRD.

An external buffer (Reorder Buffer), is implemented for undecimated separable wavelet approximation. The reorder buffer stores one row of data after vertical filtering, and feeds input to the horizontal filtering units so that the long shifting delay between two multiplication units can be deleted. The scheme uses one DWT module which is time-multiplexed to compute multiple DWTs at different time-points. FIG. 9 illustrates the reordering scheme of the reorder buffer generally at 82. A counter and a PAL programmed for each decomposition level is used to provide a proper address to the reorder buffer. This scheme is scalable and the utilization of the chip area for the horizontal filter unit is much better. The filter unit can contain more multipliers reducing the number of chips needed for implementing a horizontal filter. The scheme requires an extra PAL and counter. However, they can be shared among other horizontal filters at the same level.

Figure 10:
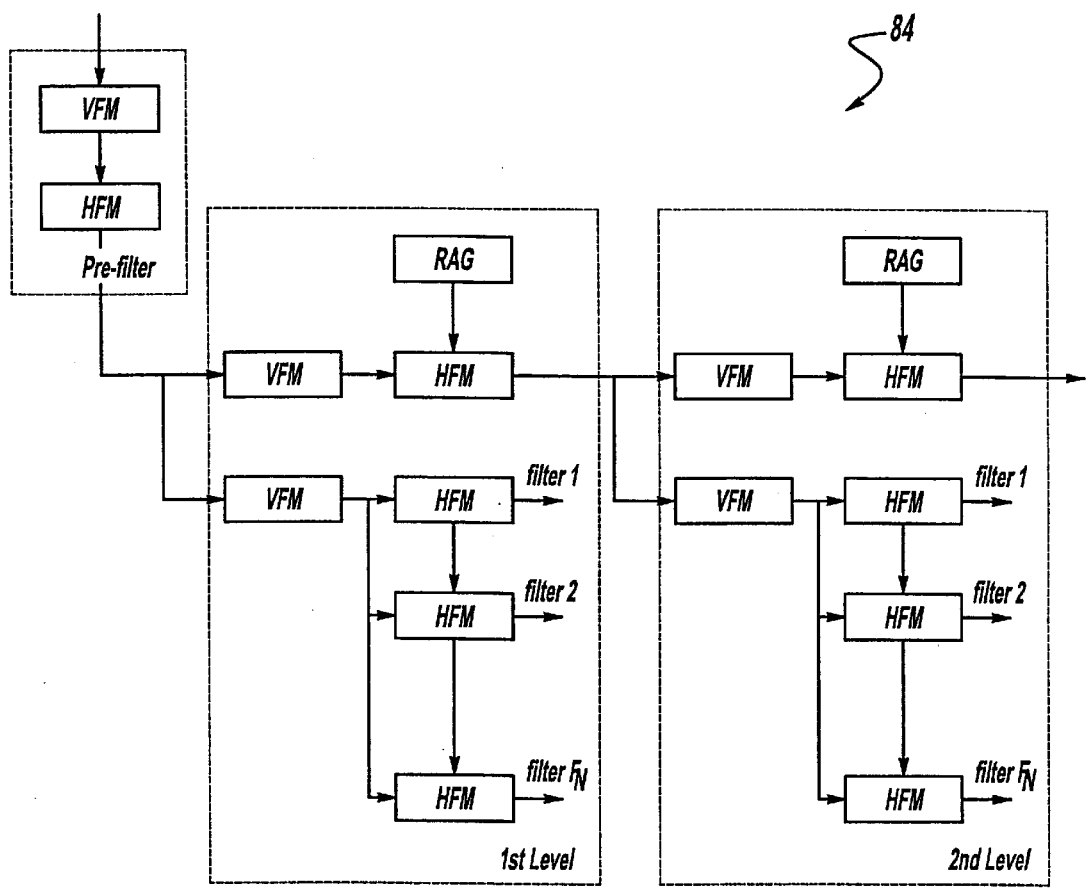
FIG. 10 is a block diagram of the structure of the SV/OSD separable approximation method combined with FSA of the present invention.

For vertical filters, a suitable implementation of a dilated filter is to introduce $M \times 2^{k-1}M$ multiplexers between the input buffer and the filter unit. The multiplexer selects the rows where non-zero filter coefficients are aligned. The complete structure for an undecimated multi-resolution decomposition system using SWA is shown at 84 in FIG. 10.

Using the scheme, the latency of the decomposition stays the same with the decimated SWA case, which is approximately, the throughput also stays $1/t_m$, the amount of computation is $2N^2 M_I + 2LN^2 M_h + LN^2 MP + LF_N N^2 MP = 2N^2 M_I + LN^2 (2M_h + MP + F_N MP)$, and the amount of storage is $NM_I + LN \max(M,M_h) + NL(F_N P+1)$. The number of reorder buffers in the system is $L(F_N P+1)$ and the number of reorder buffer address generators is $L$.

Figure 11:
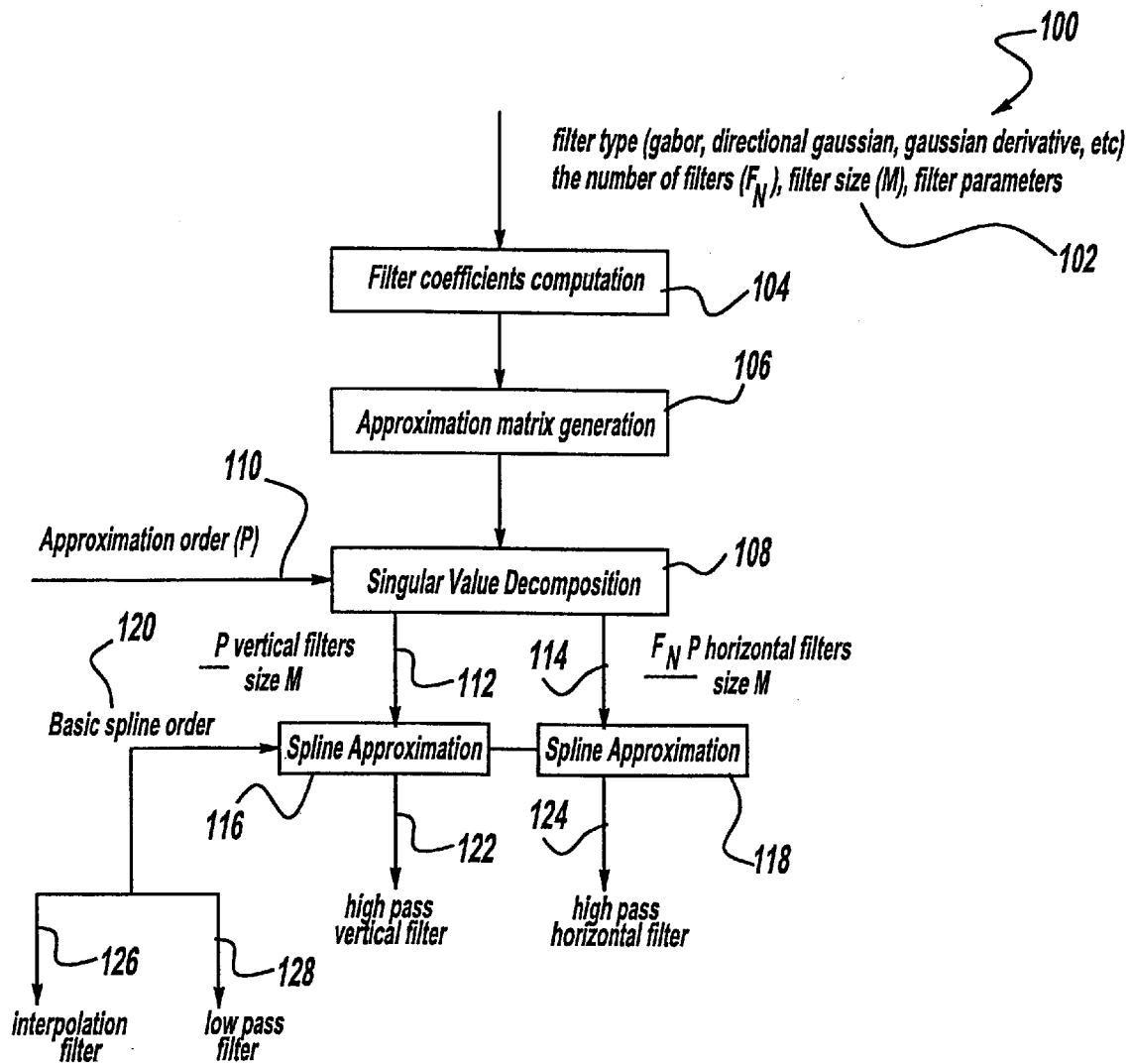
FIG. 11 is a flow diagram of the methodology involved in generating MRD filter coefficients according to the present invention.

Referring to the flow diagram 100 in FIG. 11, the methodology implemented for the multi-resolution image decomposition method of the present invention is shown. Steps 102 through 114 are identical to those steps utilized for generating the digital orientational filters through the separable approximation method described above. However, upon the vertical and horizontal filters being output at steps 112 and 114, the filters are subjected to a spline approximation as shown at 116, 118 and as described above. In addition, at step 120, a basic spline order is input into the basic spline function and is utilized along with the spline approximation calculations. Subsequently, a high pass vertical filter is output at step 122, and a high pass horizontal filter is output at step 124. In addition, an interpolation filter is output at step 126 for pre-filtering, while a low pass filter is output at step 128 for the low-pass filter banks.

III. Steerable System

In many image analysis and image processing tasks, it is useful for the filter system to have a capability of changing its orientation dynamically under adaptive control. Such a filter system is called a steerable system, and those tasks which utilize the steerability include local orientation analysis, contour following, target tracking and image enhancement. Filter $h(x,y)$ is considered steerable if a rotated copy of $h(x,y)$ at an arbitrary orientation can be expressed by a finite linear sum of basis filters. Thus, $$h_\theta(x, y) = \frac{1}{2}\alpha_0(x, y) + \sum_{n=1}^{\infty} \{a_n(x, y)\cos(n\theta) + \beta_n(x, y)\sin(n\theta)\}$$

where, $$a_n(x, y) = \frac{1}{L}\int_{-\pi}^{\pi} h_\theta(x, y)\cos(n\theta) d\theta \text{ and}$$

-continued $$\beta_n(x, y) = \frac{1}{L}\int_{-\pi}^{\pi} h_\theta(x, y)\sin(n\theta)d\theta.$$

Then a $Q^{th}$ order approximation to the steerable system can be accomplished by selected $Q$ basis filters from $a_i(x, y)$ and $\beta_i(x, y)$ with the $Q$ largest energy values. The approximation formula is $$h_\theta(x, y) \approx \sum_{i=1}^{Q} \gamma_i(x, y) q_i(\theta) \text{ where}$$

$\{\gamma_i\} \subset \{a_i, \beta_i\}$ and $$q_i(\theta) = \begin{cases} 1/2 & \text{if } \gamma_i = a_0 \\ \cos(n\theta) & \text{if } \gamma_i \in \{a_i\}, i \neq 0 \\ \sin(n\theta) & \text{if } \gamma_i \in \{\beta_i\} \end{cases}.$$

Note that (31) is the complex Fourier series of $h_\theta^*(x,y)$ which is $2\pi$ periodical in $\theta$. Thus, $a_i(x,y)=a^*_i(x,y)+j\beta^*_i(x,y)$.

In FSA, flexibility is present in its filter selection, and $a_i(x,y)$ and $b_i(x,y)$ which correspond respectively to the real and imaginary part of the complex filter $a_i(x,y)$ are separate entities in the filter selection process.

FSA+SV/OSD

The basis filters are non-separable, in general, and the method does not satisfy the orientational filter implementation criteria discussed above. For the steerable system to satisfy the criteria, SV/OSD can be applied to $\{(g_i(x,y)\}$ for the separable approximation at the expense of additional error. The approximation matrix is formed by combining for the $Q^{th}$ order FSA. Using this combination of FSA and SV/OSD, denoted as FSA+SV/OSD, an orientational filter at an arbitrary orientation can be approximated as, $$h_\theta(x, y) \approx \sum_{i=1}^{Q} q_i(\theta) \sum_{j=1}^{P} a_j(y) b_{ij}(x), \text{ where}$$

$$\gamma_i(x, y) \approx \sum_{j=1}^{P} a_j(y) b_{ij}(x) \text{ and}$$

Figure 12:
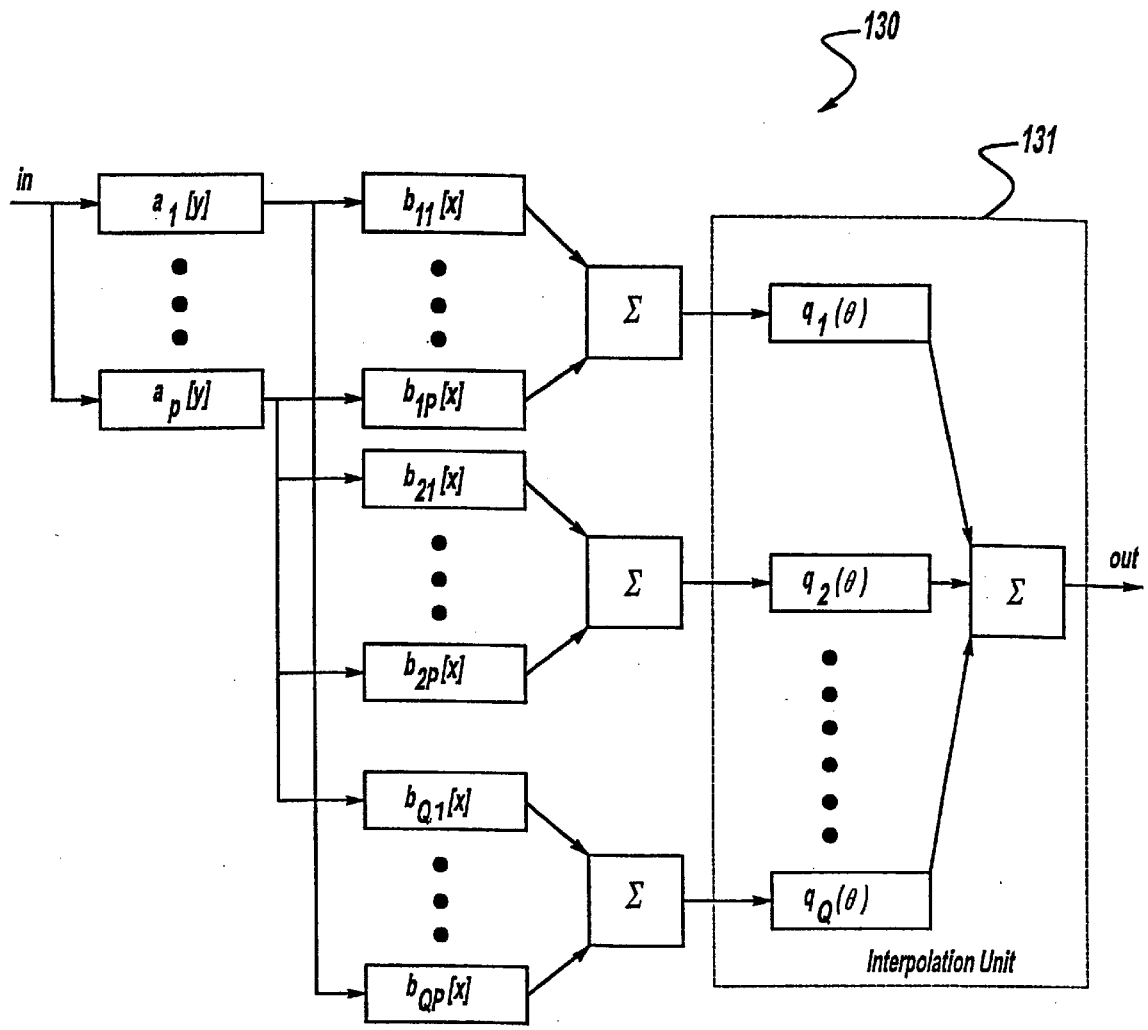
FIG. 12 is a block diagram of the structure of an SV/OSD system combined with an FSA system.

The computational structure of FSA+SV/OSD is shown at 130 in FIG. 12. To implement a system with multiple orientations, the number of orientation control units (inside the dashed box in FIG. 12) must equal the number of required orientations.

The throughput of the system can be $1/t_m$, the latency is O(NM), the amount of computation is $N^2(MQP+F_N)$, and the storage requirement is NM.

FSA+SWA

The next extension for the steerable system is to add MRD capability. FSA and SWA can be combined in the following way. First, the filter of interest is decomposed with FSA. Second, each basis filter is decomposed into a separable form using SV/OSD. Third, each separable pair is approximated using the Wavelet Approximation. This approximation process is defined by $$d_{m,n}^k = \sum_{c=1}^{Q} q_c(\theta) \sum_{l} \sum_{j_x} g_{cl}^x[j-m] \sum_{j_y} g_l^y[j_y - n] c_{j_x,j_y}^{k-1}, \text{ where}$$

-continued $$c_{m,n}^k = \sum_{l} \sum_{j_x} \tilde{h}[j_x - 2m] \sum_{j_y} \tilde{h}[j_y - 2n] c_{j_x,j_y}^{k-1}, \text{ with}$$

$$c_{m,n}^0 = \sum_{i_x,i_y} f[i_x, i_y] \phi_l(m - i_x) \phi_l(n - i_y).$$

Figure 13:
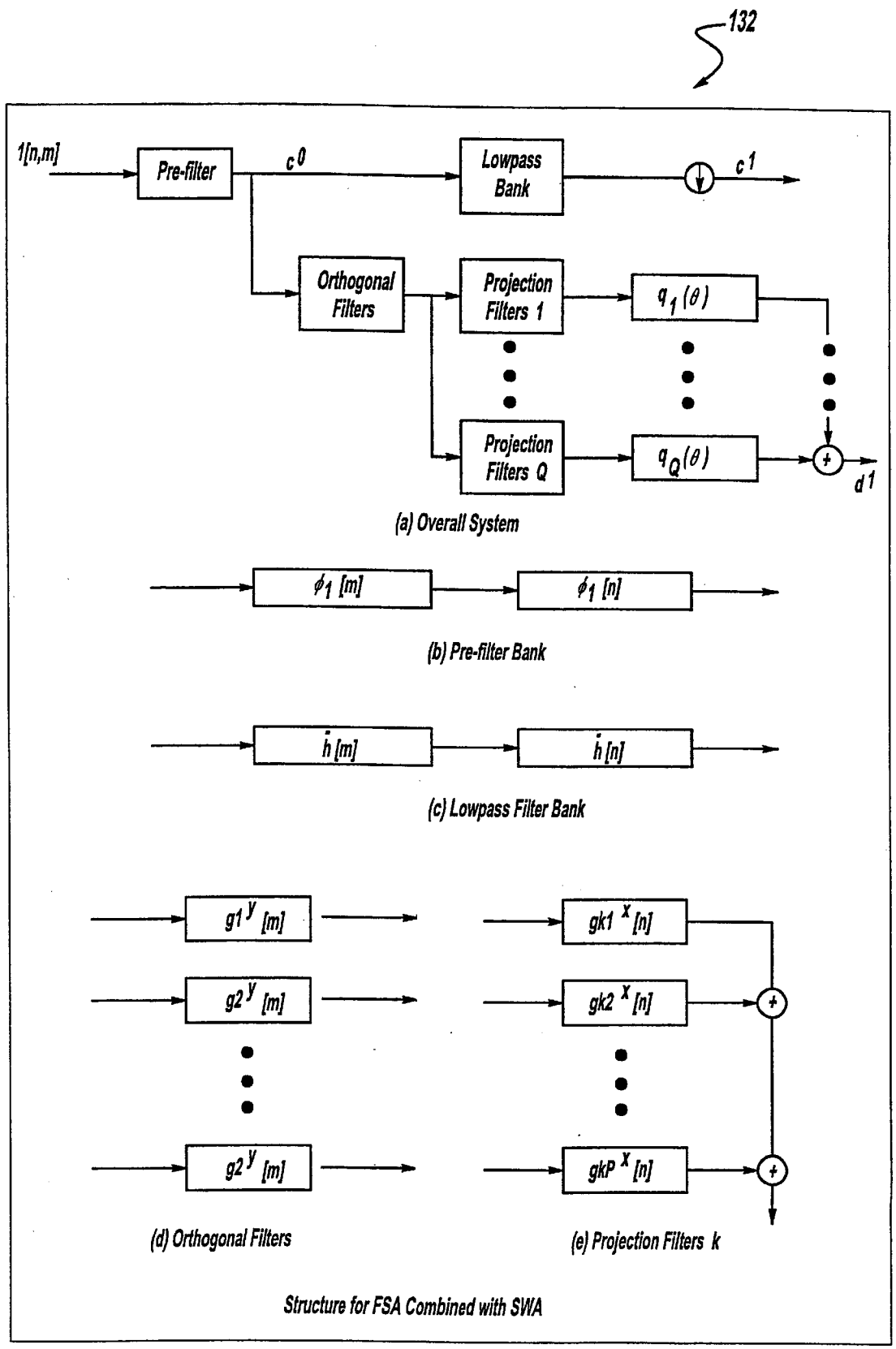
FIG. 13 is a block diagram of the structure for an FSA system combined with an SWA system.

FIG. 13 shows the structure AT 132 which corresponds to the approximation. The pre-filter and low-pass modules are the same as SWA. The high pass modules are divided into three parts: orthogonal filters, projection filters, and interpolation units. The orthogonal filters and projection filters approximate the FSA basis functions using SV/OSD. They are followed by the interpolation unit to steer the filter to a particular orientation. The orthogonal filters and projection filters can be shared among filters at different orientations. An independent interpolation unit is necessary for each orientation.

Figure 14:
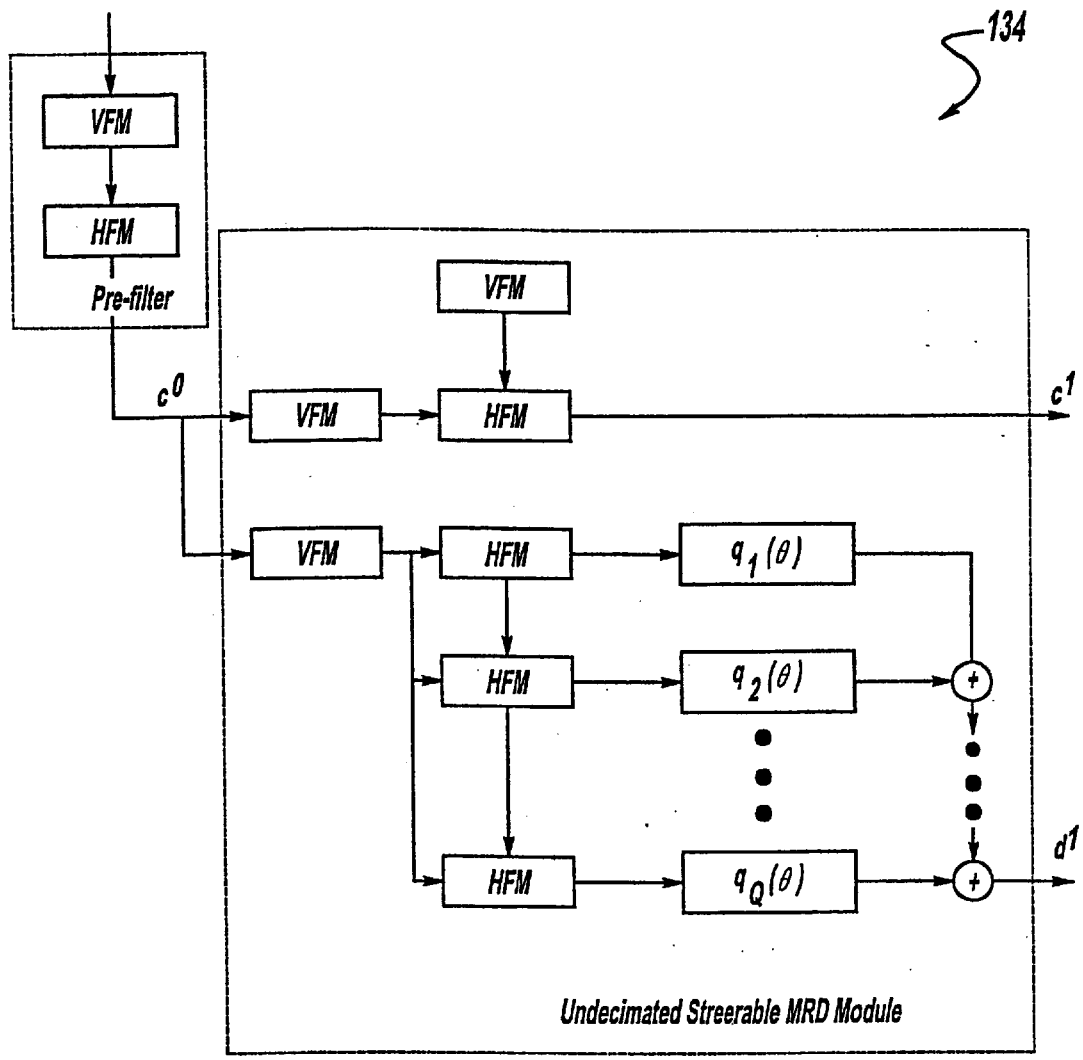
FIG. 14 is a block diagram of the structure of an undecimated steerable MRD system.

The idea of undecimated MRD discussed above can be easily extended for steerability in a very similar way as the above decimated MRD scheme. FIG. 14 shows the structure of the undecimated steerable MRD at 134. The only difference between FIGS. 13 and 4 in terms of the hardware structure is the addition of the interpolation units which steer the filter. The lower portion of the MRD module in FIG. 14 approximates a set of FSA basis functions, whereas the counterpart in FIG. 13 approximates a set of orientational filters. It also requires LQ(P+1)+1 reorder buffer and L reorder buffer address generators.

Figure 15:
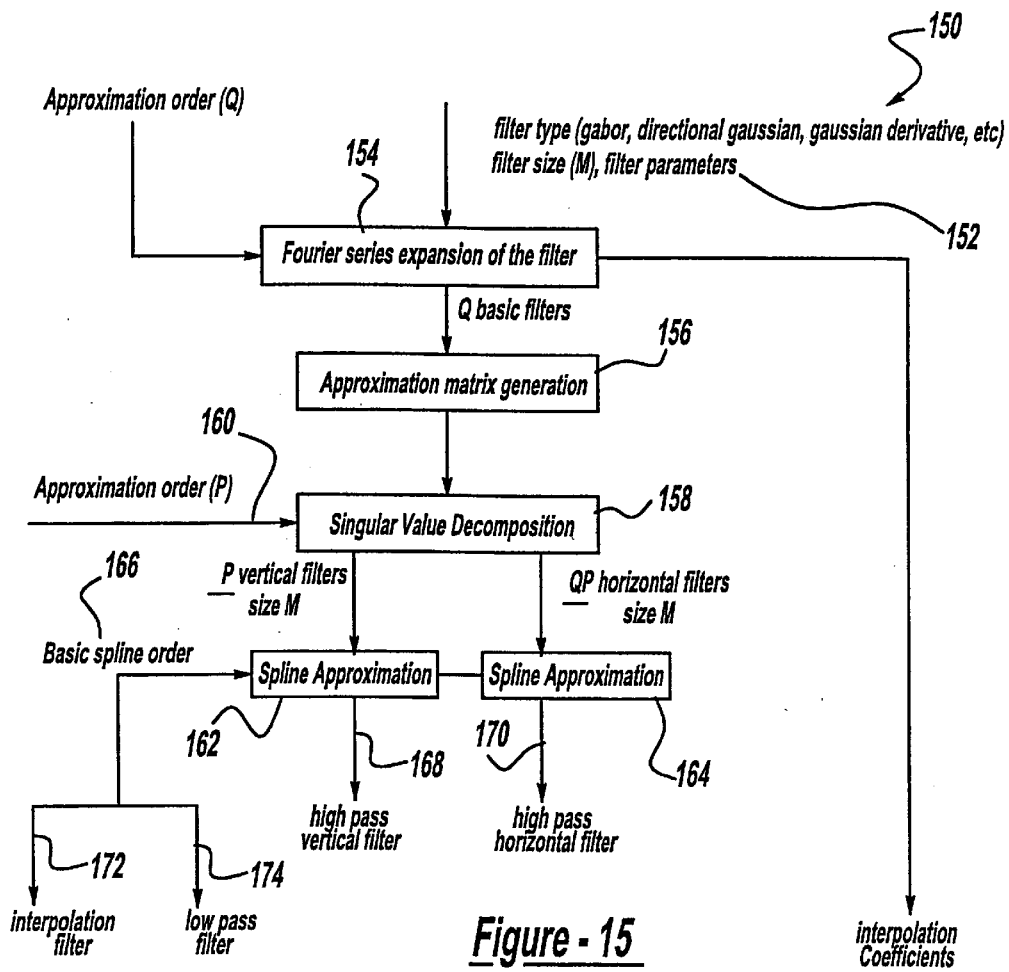
FIG. 15 is a flow diagram of the methodology for generating steerable filter coefficients according to a preferred embodiment of the present invention.

Referring to FIG. 15, the flow diagram shown at 150 represents the methodology utilized to implement steerable digital orientational filter system. The methodology steps 152–174, except step 154, are identical to the flow diagram steps shown at 100 in conjunction with the description of the multi-resolution image decomposition method of the present invention. The methodology shown at 150 differs in that the approximation contains (Q) orientation independent to 2D basis filters instead of multiple orientation filters as in 100. The basis filters are the results of Fourier series expansion applied to the mother wavelet filter. Step 154 also produces interpretation coefficients which are used to adjust (steer) the orientation of the overal filter operation.

IV. Hardware Design

The following description relates to hardware design of a set of VLSI chips for SV/OSD, SWA and FSA+SWA implementation. First, the design for SV/OSD is considered. Second, the design for SV/OSD is adapted for SWA. Third, the design for undecimated SWA will be discussed. Fourth, it is shown that a modification on the design for SWA can implement FSA+SWA.

In addition to the design criteria discussed earlier, an additional design concern is scalability. Four types of scalability are considered:

1. Input Image Scalability.

The system can accommodate any input image size by only changing the size of the input buffer which is implemented with discrete memory chips.

2. Filter Number Scalability.

The design is modular so that the number of filters can be increased by adding extra filter components to the system. The amount of hardware increased only linearly as the number of filters increases.

3. Filter Size Scalability.

The size of filters can be increased by adding extra filter components to the system. No new design is necessary for a different filter size. The amount of hardware increases only linearly as the filter size increases.

4. Approximation of Scalability.

The order of approximation can be increased by adding extra filter components to the system. No new design is necessary for a different approximation order. The amount of hardware increases linearly as the order of approximation increases.

The main components of the design are a separable approximation filter bank and a 2D separable filter. The filter bank is implemented using two custom made VLSI chips: vertical filter chip (VFC) and horizontal filter chip (HFC). The 2D separable filter is implemented with single custom made VLSI chip, separable filter chip (SFC).

In the following description, it is assumed that a memory chip allows simultaneous write and read operations in one clock cycle. This can be done by either using dual port RAM, using two separate memory chips for read and write, using a video RAM for random writes and sequential reads, or using fast RAM so that on one phase (high clock) the memory can be read and on the other phase (low clock) it can be written. The width of the input pixels to the system is denoted as $B_p$.

Many signal names in the design have numeric post-fixes, such as hout1 and vout2. Within the text, the notation <signal_prefix>$$ is used to refer to the set of signals with the same prefix but different numeric post-fixes. For example, hout$$ implies hout1, hout2, hout3, and so on.

Signals internal to the VLSI chip are indicated with a single underline. All signals without an underline are external to the VLSI chip.

Figure 16:
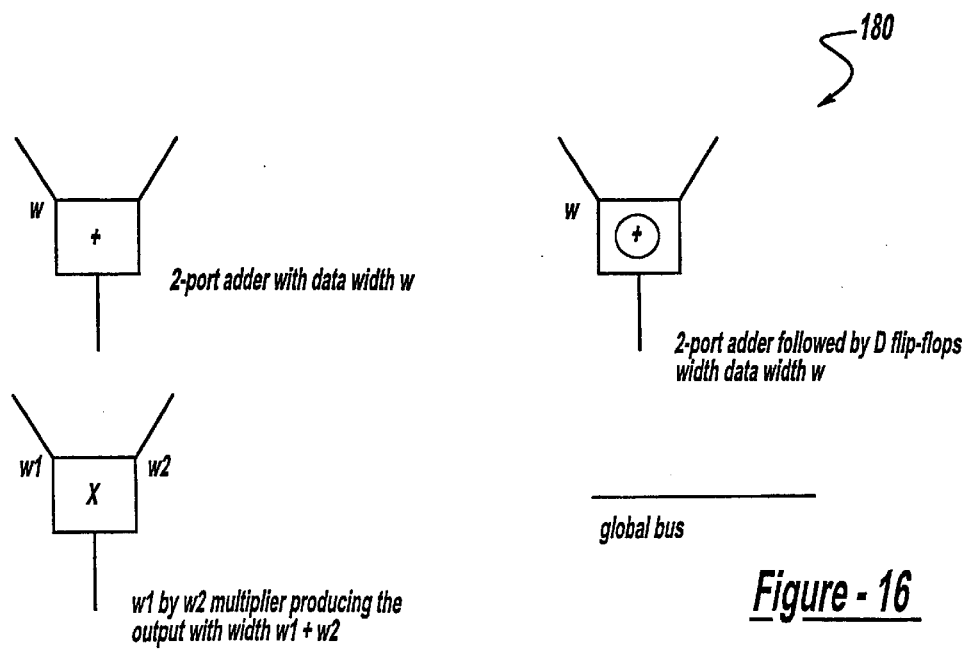
FIG. 16 illustrates the hardware symbol representations for hardware used to implement a steerable MRD system of the present invention.

FIG. 16 shows at 180 the symbols used in later figures to represent certain components in the designs.

SV/OSD

Figure 17:
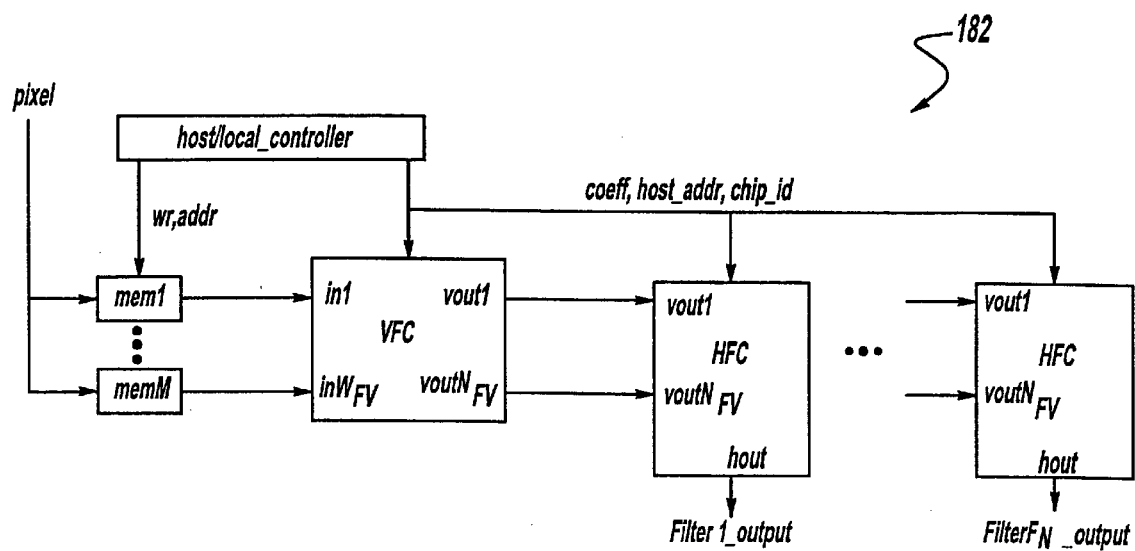
FIG. 17 is a block diagram of the VLSI architecture of an SV/OSD system of the present invention.

The VLSI implementation structure of SV/OSD is shown at 182 in FIG. 17. The structure can be divided into three modules: input buffer, vertical filters and horizontal filters. The vertical filters and horizontal filters are to be designed in separate VLSI chips, since only one set of vertical filters is needed for the whole system (for single stage filtering), whereas each orientational filter needs its own set of horizontal filters.

Input Buffer

An intermediate memory module is used to provide M parallel inputs to the vertical filters. The memory module consists of M independent memory banks whose size is N words each. One memory module is needed for all the orientational filters. A separate intermediate memory module is needed at each level of MRD.

Components Count

The memory module requires M memory chips of N words each.

Vertical Filter Chip (VFC)

Figure 18:
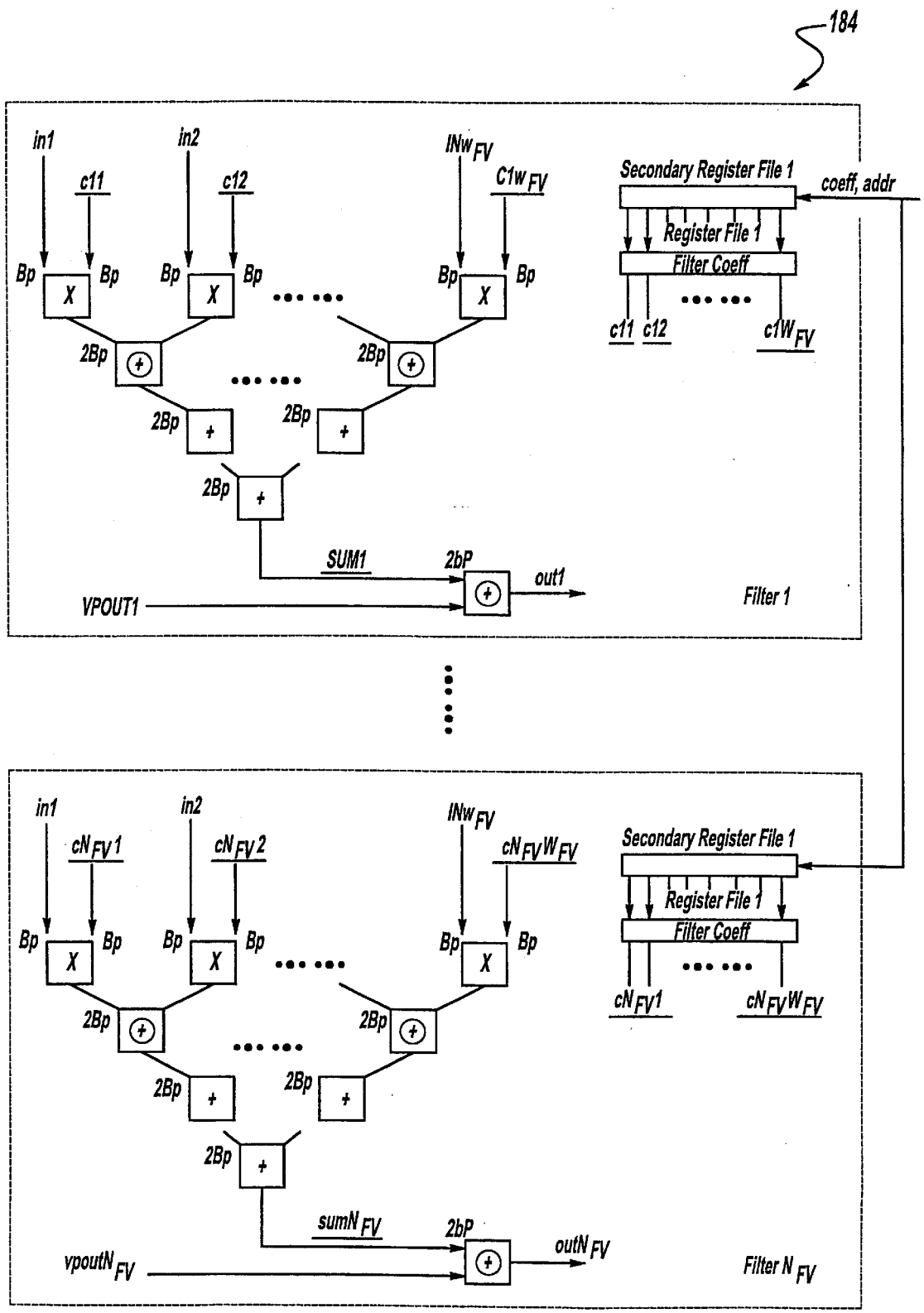
FIG. 18 is a block diagram of the structure of a vertical filter chip according to the present invention.

Each vertical filter requires M multipliers and M−1 adders. Assume $W_{FV}$ is the width of a filter implemented in a VFC, and $N_{FV}$ is the number of filters implemented in the chip. The chip requires $B_p W_{FV}$ input ports where input pixels are received in parallel. It also requires $2B_p N_{FV}$ outputs ports where the output of $N_{FV}$ vertical filters are sent to the horizontal filter chip. The pixel width is doubled after multiplication to preserve accuracy. Each filter in the chip requires a register file of $B_p W_{FV}$ bits where the filter coefficients are stored. The coefficients for each multiplication do not change while the input is coming from the same row, but change when the input moves to the next row since it is easier to update the coefficients at every new row than to change the parallel input pattern from the memory banks to the chip. The secondary register file is provided to enable a smooth transition from one row to the next row. Its contents are updated with a new set of filter coefficients while the filter coefficients are read from the primary register file. At the end of the row, the contents of the secondary register file are transferred to the primary register file, and filtering for the next row can proceed continuously without any interruption. Either the host or a local_controller which resides on the same board with the filter chip can be used to store a new set of coefficients to the secondary register file. The structure of the VFC is shown in FIG. 18.

An extra adder at the end of each parallel filter is used to add the output of the filter (sum$$) and a partial result (vpout$$) which is provided externally. This adder is needed when the size of the filter is larger than $W_{FV}$.

Component Count

The table below lists the major components in a VFC and their counts.

Component Count of the Vertical Filter Chip

| Component Type | Count | Size (bits) |
| --- | --- | --- |
| Multiplier | $W_{FV}N_{FV}$ | $B_p \times B_p$ |
| Adder | $W_{FV}N_{FV}$ | $2B_p$ |
| D flip-flop | $N_{FV}W_{FV}$ | $2B_p$ |
| Register File | $2W_{FV}$ | $B_p$ |
| Input Ports | $(W_{FV}+2N_{FV}+1)B_p$ | 1 |
| Output Ports | $2N_{FV}B_p$ | 1 |
| Global Bus | $W_{FV}+1$ | $B_p$ |

Horizontal Filter Chip (HFC)

The horizontal filter unit employs a pipelined filtering scheme. Each filter requires M multipliers and M−1 adders. There is no need for a buffer between a vertical filter and horizontal filter pair. The output of the vertical filter can be directly fed to the HFC. Outputs of the horizontal filters are added together by a binary adder to form the linear sum of the separable approximation. The structure of the HFC is shown at 186 in FIG. 19.

Assume $W_{FH}$ is the width of a filter implemented in a HFC, and $N_{FH}$ is the number of filters implemented in the chip. Note that the number of bits in the output of vertical filtering is $2B_p$ to preserve accuracy. The chip requires $2B_p N_{FH}$ input ports where input pixels are received sequentially for $N_{FH}$ filters. It also requires $B_p$ input ports (coeff) for loading filter coefficients, and $3B_p N_{FH}$ input ports (hpout$$) for a partial result of the horizontal filtering, $3B_p$ input ports (psum) for a partial result of the linear sum for the separable approximation. The ports hpout$$ are used when the filter size is larger than $W_{FH}$, and the ports psum is used when approximation order is larger than $N_{FH}$. It requires $3B_p$ output ports for the result from the binary adder, and $3N_{FH}B_p$ output ports for the partial results from each filter before the binary adder. The latter outputs are used together with hpout$$ when the filter size is larger than $W_{FH}$. The secondary register files are provided for updating the filter coefficients without an interruption to the filtering. Unlike vertical filtering, the coefficients are fixed as long as the orientational filter being approximated is the same.

Component Count

The table below lists the major components in a HFC and shows their sizes and counts.

Component Count of the Horizontal Filter Chip

| Component Type | Count | Size (bits) |
|---|---|---|
| Multiplier | $W_{FH}N_{FH}$ | $2B_P \times B_P$ |
| Adder | $W_{FH}N_{FH}$ | $2B_P$ |
| D flip-flop | $N_{FH}W_{FH}+1$ | $3B_P$ |
| Register File | $2W_{FH}$ | $B_P$ |
| Input Ports | $(5N_{FH}+4)B_P$ | 1 |
| Output Ports | $(3N_{FH}+3)B_P$ | 1 |
| Global Bus | $N_{FH}+1$ | $2B_P$ |

Architecture p FIG. 17 shows the VLSI architecture of SV/OSD with $F_N$ orientational filters being implemented. Each box corresponds to one VLSI chip. Every HFC obtains the same vout inputs from VFC, which may not be clear from the figure.

Figure 19:
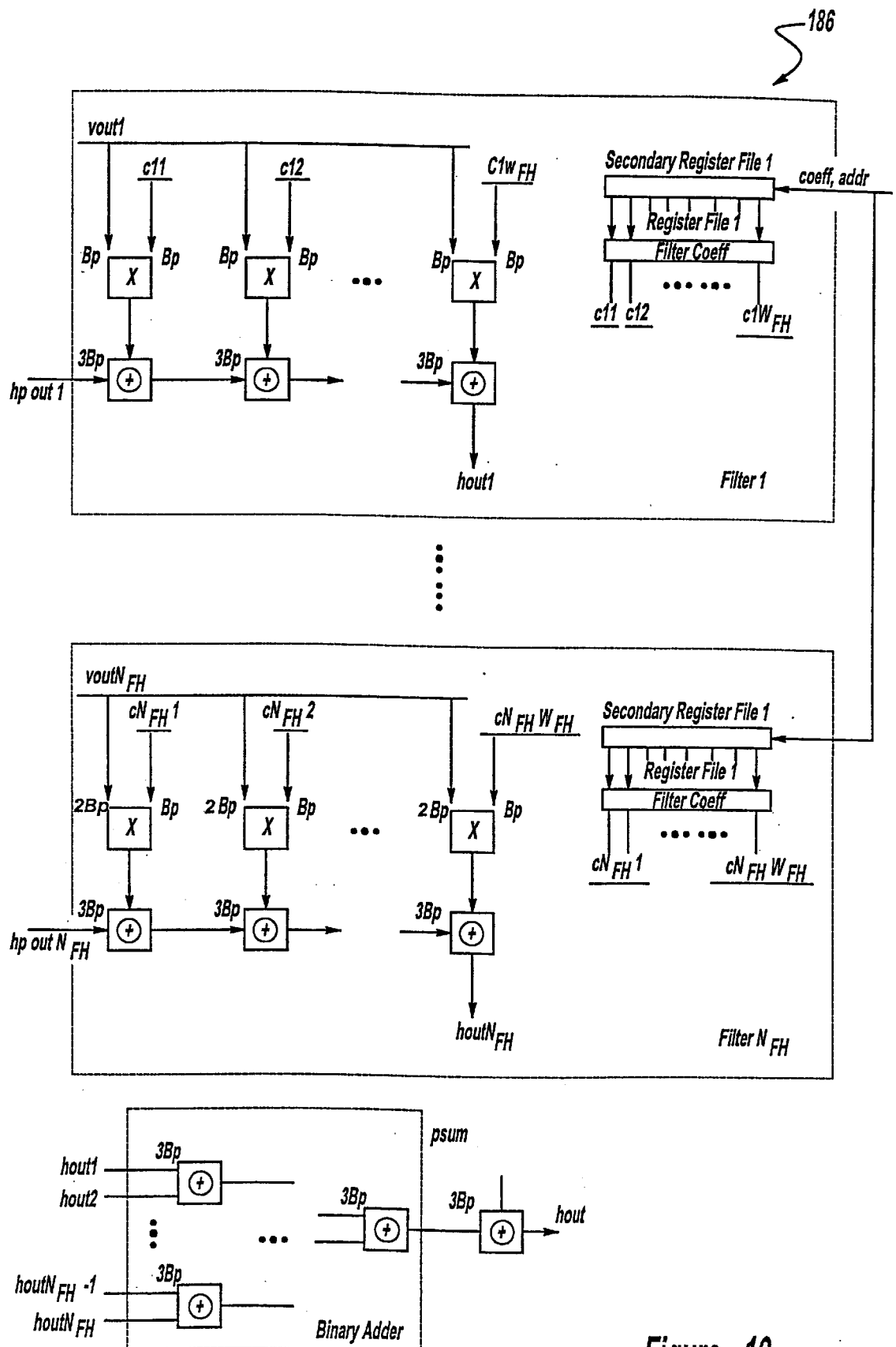
FIG. 19 is a block diagram of the structure of a horizontal filter chip according to the present invention.

Only the input buffer module is affected by the input image size. Thus, the architecture satisfies the first scalability. The number of orientational filters implemented can be increased by adding more HFC module as shown at 190 in FIG. 20. Thus, the second scalability is satisfied. When the filter size M is larger than $W_{FV}$ and $W_{FH}$, additional VFCs and HFCs can be connected to as shown. Each VFC obtains inputs (in$$) from distinct memory banks. The outputs of the first VFC are connected to the input (vpout$$) of the next VFC. The last VFC of the sequence produces the results of the vertical filtering which are passed to HFCs in the same way as in FIG. 19. Multiple HFC are connected in cascade. Every HFC obtains the same vout$$ from the last VFC. Each HFC except the last one produces partial results from each filter (hout$$), which are connected to hpout$$ of the next HFC in the chain. The last HFC produces the complete result of the separable approximation. The architecture satisfies the third scalability criterion. When the approximation order P is larger than $N_{FV}$ and $N_{FH}$, additional VFCs and HFCs can be connected to existing VFCs and HFCs as shown in FIG. 19. Every VFC receives the same set of inputs from the memory module. There is no interconnection among VFCs. The output of a VFC (vout$$) is connected to vout$$ of the corresponding HFC. In the HFC chain, the output hout is connected to psum of the next HFC, if any. The last HFC produce the complete result of the separable approximation. The architecture satisfies the fourth scalability criterion.

SWA (Decimated MRD)

Implementation of SWA can be divided into three modules: pre-filter, low-pass filter, and high-pass filter modules. Both the pre-filter and low-pass filter are separable filters, and each of them can be implemented with a single VLSI chip. The high-pass filters are implemented using SV/OSD.

Pre-filter Unit

The pre-filter is a separable filter. Note that the size of the pre-filter is k×k when a $k^{th}$ order basic spline is used for the approximation, and the spline order is typically set to 7. Assume $W_{FS}$ is the width/height of the filter implemented in the separable filter chip (SFC) shown at 192 in FIG. 21. The chip contains $2W_{FS}$ multipliers and $2W_{FS}-2$ adders. The result of the vertical filter (vout) is an external output and the input to the horizontal filter (muxout) can be either vout or the internal signal, hin. This extra multiplexing is needed for undecimated MRD. For the decimated MRD, the select signal for the multiplexer (decimate) is 1, and the input to the horizontal filter is the immediate output from the vertical filter. For the undecimated MRD, the select signal for the multiplexer (decimate) is 0, and the input to the horizontal filter is the external input, hin, which is supplied from a reorder buffer.

It requires the following input ports: $B_P W_{FS}$ for parallel input pixels (in$$), $2B_P$ for hin, and $B_P$ for filter coefficients (coeff). It requires the following output ports: $2B_P$ for vout and $3B_P$ for the filter output (out).

Component Count

The table below lists the major components in a SFC and shows their sizes and counts.

TABLE 9-3

Component Count of the Separable Filter Chip

| Component Type | Count | Size (bits) |
|---|---|---|
| Multiplier I | $W_{FS}$ | $B_P \times B_P$ |
| Multiplier II | $W_{FS}$ | $2B_P \times B_P$ |
| Adder I | $W_{FS}-1$ | $2B_P$ |
| Adder II | $W_{FS}-1$ | $3B_P$ |
| D flip-flop I | $W_{FS}$ | $2B_P$ |
| D flip-flop II | $W_{FS}-1$ | $3B_P$ |
| multiplexer | 1 | $2B_P$ |
| Register File | $4W_{FS}$ | $B_P$ |
| Input Ports | $(W_{FS}+3)B_P$ | 1 |
| Output Ports | $5B_P$ | 1 |
| Global Bus | $3B_P$ | 1 |

Low-pass Filter Unit

Figure 21:
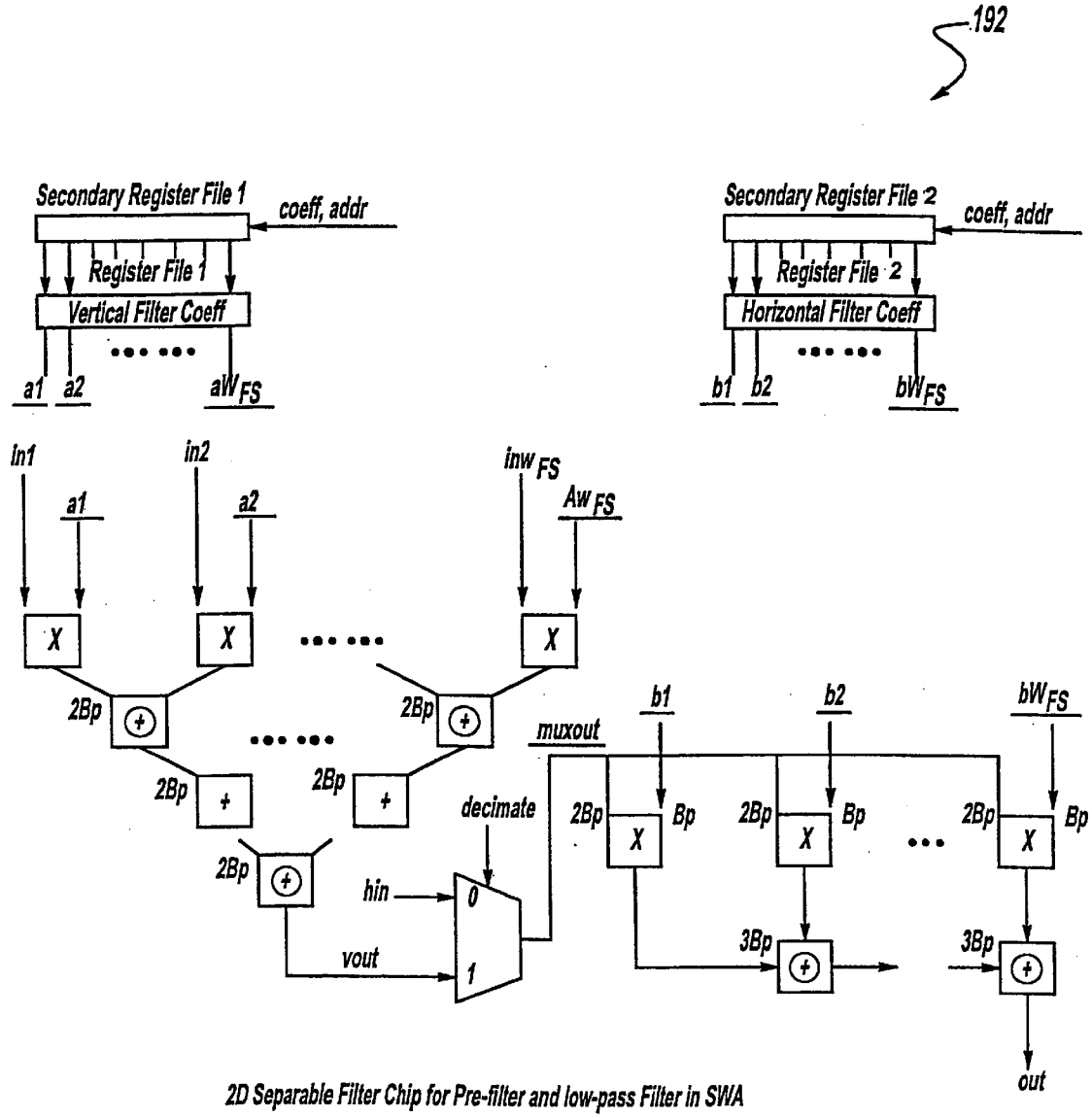
FIG. 21 illustrates the VLSI architecture of a 2D separable filter chip of the present invention.

The SFC shown in FIG. 21 can be used for low-pass filtering. The size of the low-pass filter is k+2×k+2 for a $k^{th}$ order basic spline. Thus, the size of the low-pass filter is a little larger than the pre-filter. A typical filter length for the low-pass filter is 9×9.

High-pass Filter Unit

The high-pass filters are implemented with SV/OSD. The structure shown at 182 in FIG. 17 can be used.

Architecture

Figure 22:
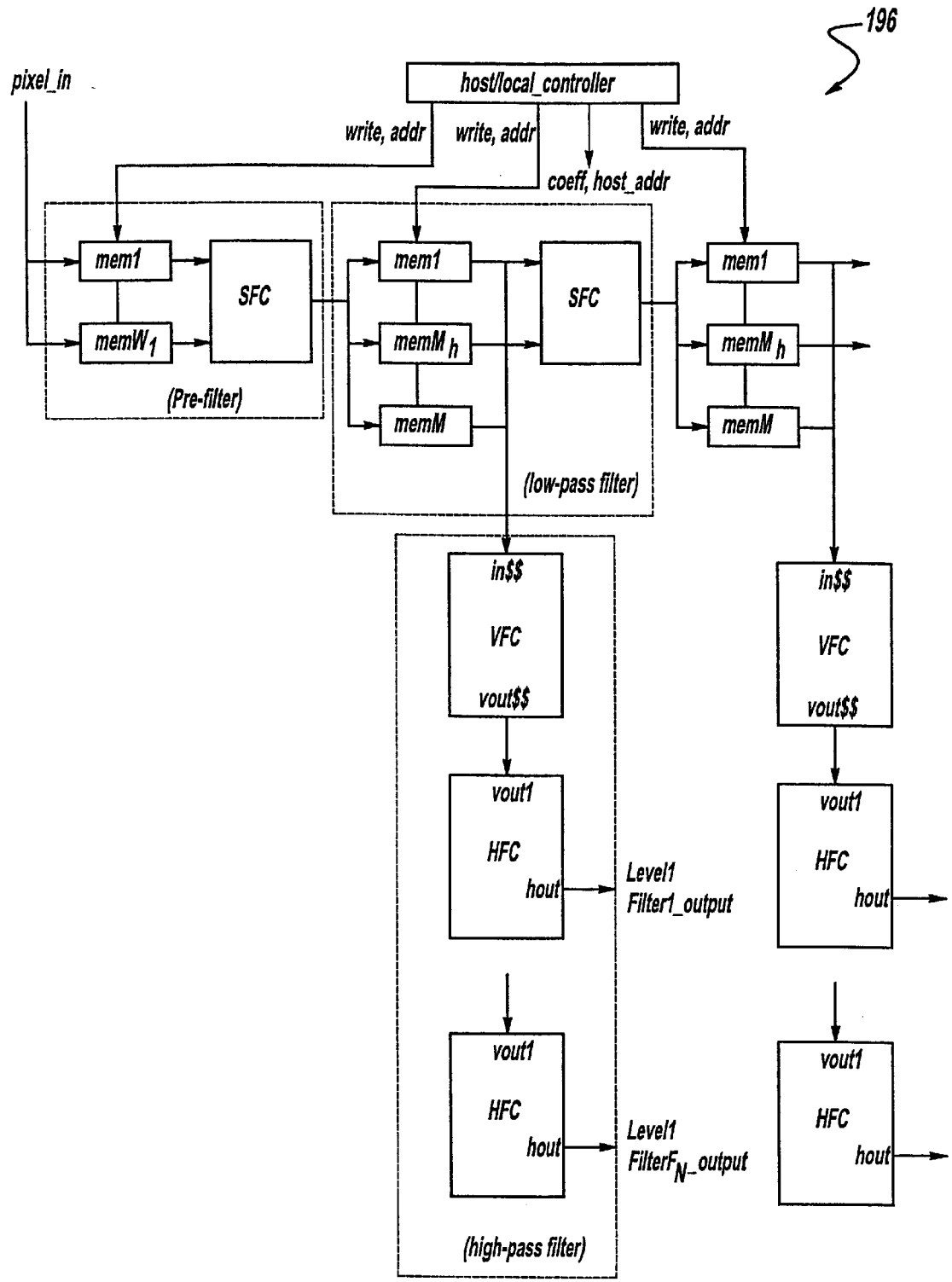
FIG. 22 illustrates the VLSI architecture for a decimated SWA system of the present invention.

FIG. 22 shows a VLSI architecture to implement SWA for decimated MRD at 196.

The size of each memory bank at the $k^{th}$ level of decomposition is $N/2^{k-1}$ due to a decimation of the output. The host/local_controller provides write signal to each memory bank. The decimation at the $k^{th}$ stage can be performned by providing a write signal to memory banks so that only every other row of outputs are stored in which only every other column is stored. No decimation is done after the pre-filtering.

Only the memory chips have to be replaced when the input image size becomes large. Thus, the first scalability criteria is satisfied. The number of orientational filters implemented can be increased by adding more HFCs in the high-pass filter module. Thus, the second scalability criteria is satisfied. The sizes of the pre-filter and low-pass filter are independent of the size of the orientational filters and are dependent on the order of the basic spline used in the approximation. The size of the high-pass filters is the same as the size of the orientational filters. The third and fourth scalability criteria can be accomplished by employing a scheme such as that shown in FIG. 20 for the high-pass filter module.

Undecimated SWA

Input Buffer

At the $k^{th}$ level decomposition, the total amount of data at the input buffer increases due to dilation of filters to $2^{k-1}MN$ which is divided into M memory banks each having a size of $2^{k-1}N$. Consider each memory bank as a 2D memory array with the number of columns being N and the number of rows being $2^{k-1}$. For the first N cycles, each memory bank outputs the data from the first row. For the second N cycles, it outputs the data from the second row. After $2^{k-1}$N cycles, the memory access returns to the first row. This way of dividing the memory buffer removes the M $2^{k-1}$ way multiplexers. The input pixel is written to the input buffer at a consecutive location in the first memory bank for $2^{k-1}$N cycles, and the access moves to the next bank, and so on. After $2^{k-1}$MN cycles, the access returns to the first memory bank. The host or the local_controller has to provide proper addresses to each memory bank.

Reorder Buffer

As described above, a reorder buffer stores one row of data after a vertical filtering. The reorder buffer and a reorder buffer address generator provides a sequence of data to horizontal filters.

Architecture

Figure 20:
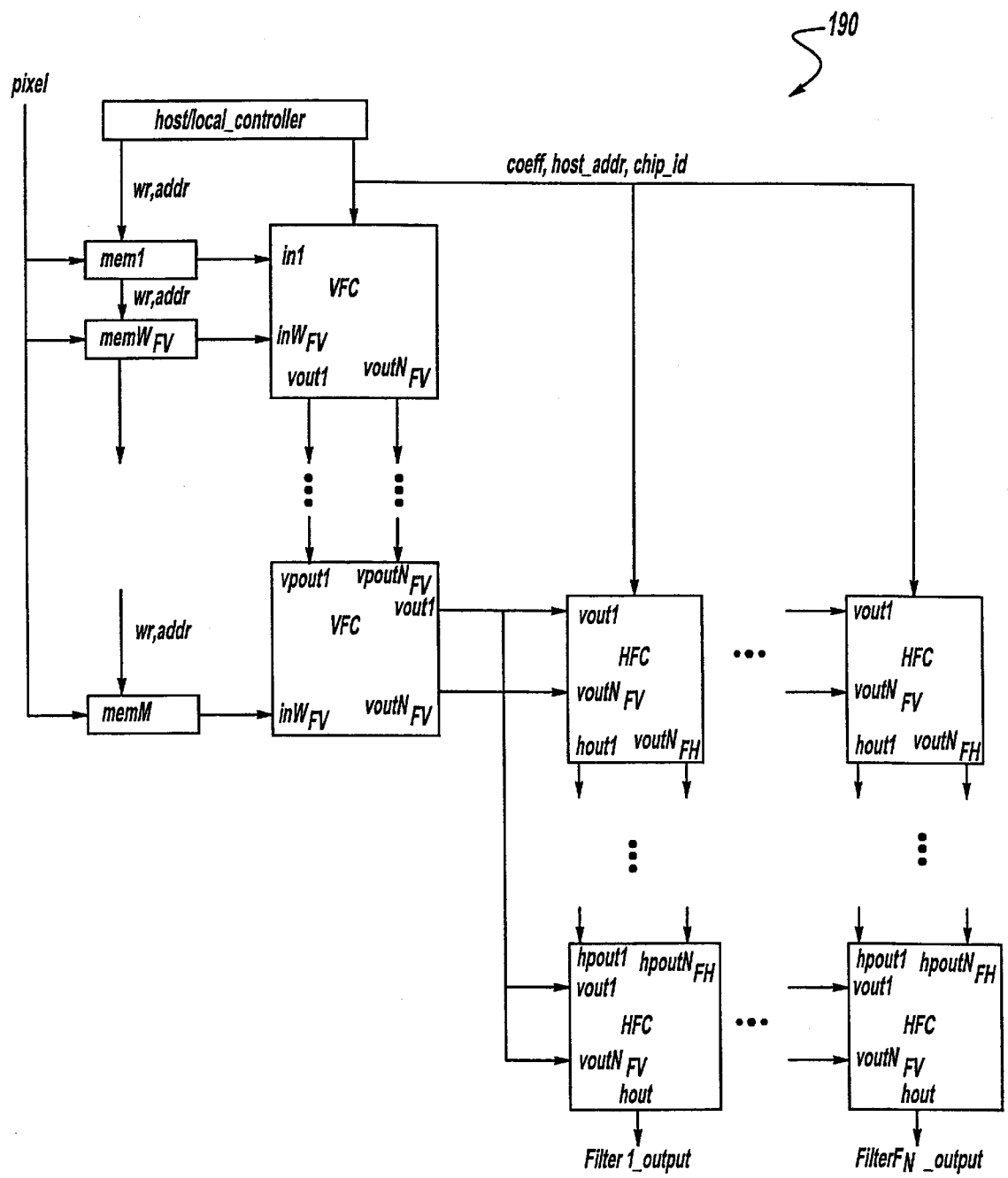
FIG. 20 is a block diagram of the VLSI architecture of an SV/OSD implementation of the present invention.

FIG. 20 shows the VLSI architecture for undecimated SWA. The host/local_controller generates all the addresses to the reorder buffers as well as the input buffers instead of having a separate address generator. The reorder buffers in the $k^{th}$ level of the high-pass filters can be shared among the horizontal filters in the level. Note that in a low-pass filter module, the SFC provides an input to the reorder buffer, and the output of the reorder buffer is fed back to the SFC for horizontal filtering. An input signal, decimate, at the SFC has to be 0 for this configuration. The architecture satisfies all the scalability criteria.

FSA+SV/OSD

FSA+SV/OSD can be implemented with a modification to the architecture for SV/OSD shown in FIG. 17. The interpolation module has to be designed and placed after the horizontal filters. The module interpolates the outputs from the basis filters to steer the filter. The module requires Q multipliers and Q-1 adders assuming the order of FSA is Q.

Interpolation Unit

An interpolation unit takes an output of every basis filter as an input every cycle, and multiplies the output with an interpolation coefficient. The results of the multiplications are added together at a binary adder. FIG. 16 depicts this computational scheme. It requires multiple interpolation units when the system implements multiple steerable filters.

It can be seen from FIG. 16 that the VFC can be used to implement interpolation units. The parallel inputs (in$$) come from the set of basis filters, the register file contains the interpolation coefficients, and each unit in VFC is assigned to steer the orientational filter to a certain orientation.

Architecture

Figure 23:
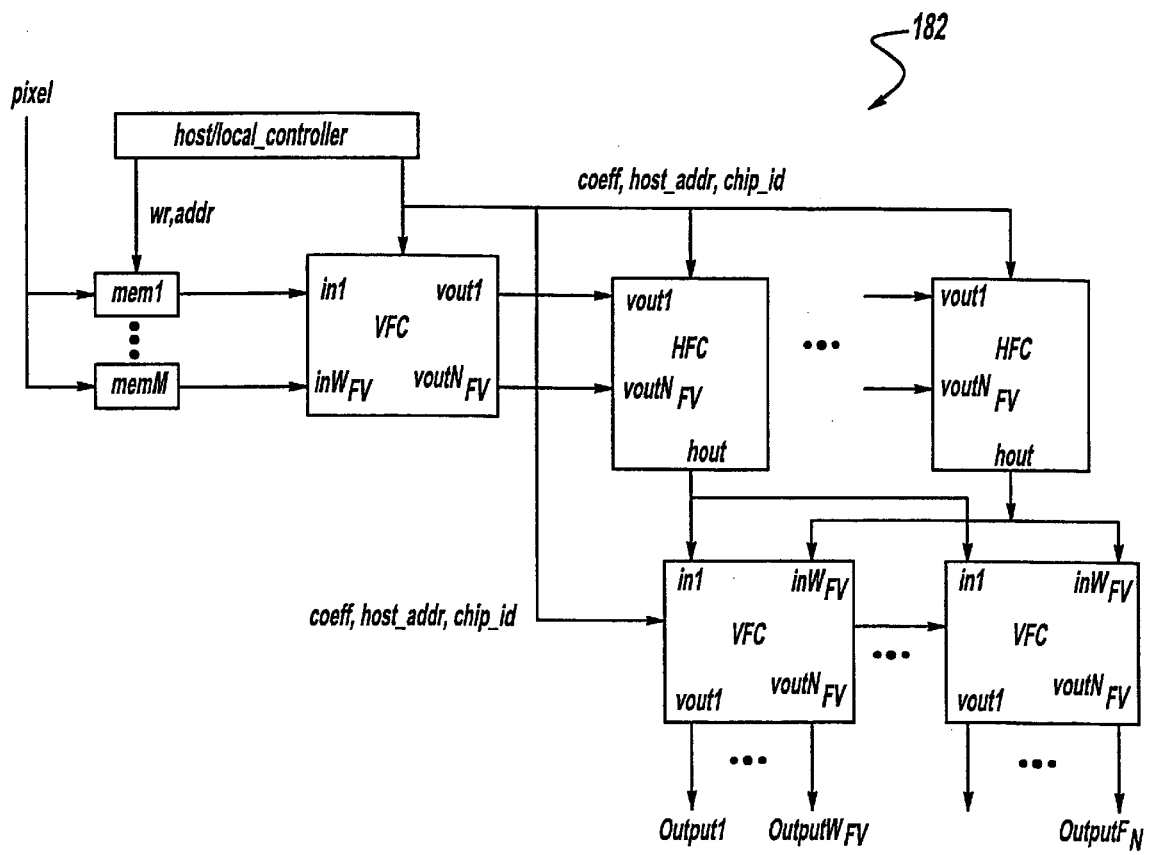
FIG. 23 illustrates the VLSI architecture of FSA combined with an SV/OSD system of the present invention.

The VLSI architecture for FSA+SV/OSD is shown at 200 in FIG. 23. The only difference from FIG. 17 is the additional VFC after the set of HFCs. The first, third and fourth scalability criteria can be accomplished in the same way as SV/OSD as previously discussed. When the number of orientations the system must steer exceeds $N_{FV}$, multiple VFCs are needed after HFCs as shown in FIG. 23. Thus the architecture satisfies all scalability requirements.

System Integration

Figure 24:
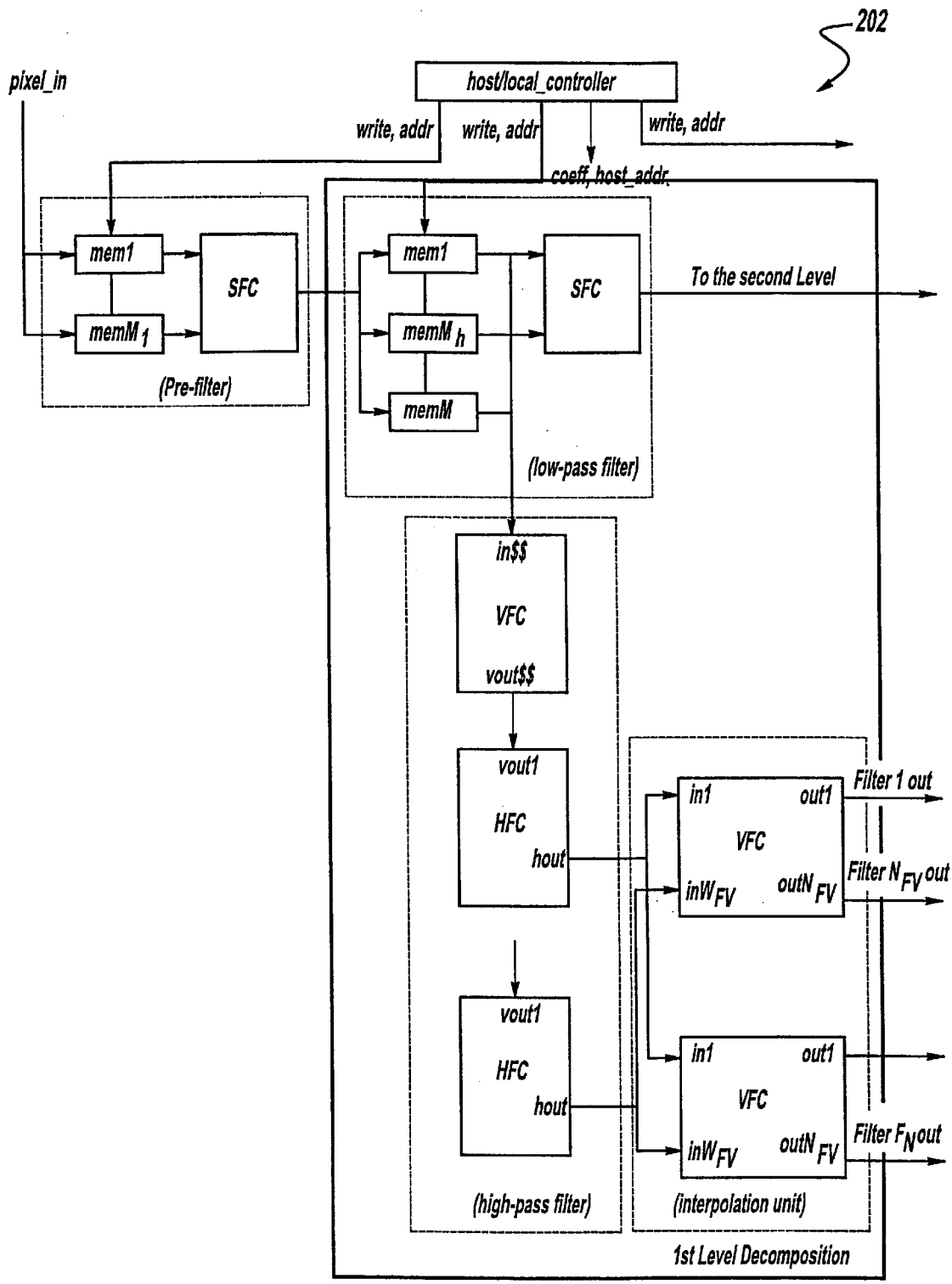
FIG. 24 illustrates the VLSI architecture for decimated FSA+SWA system of the present invention.

Finally the VLSI architecture for FSA+SWA is considered. It achieves the implementation criteria, MRD capability, and steerability. The architecture is constructed by modifying the architecture for SWA. Both decimated and undecimated FSA+SWA are considered here. ps Decimated FSA+SWA The architecture for decimated FSA+SWA is shown at 202 in FIG. 24.

Undecimated FSA+SWA

Figure 25:
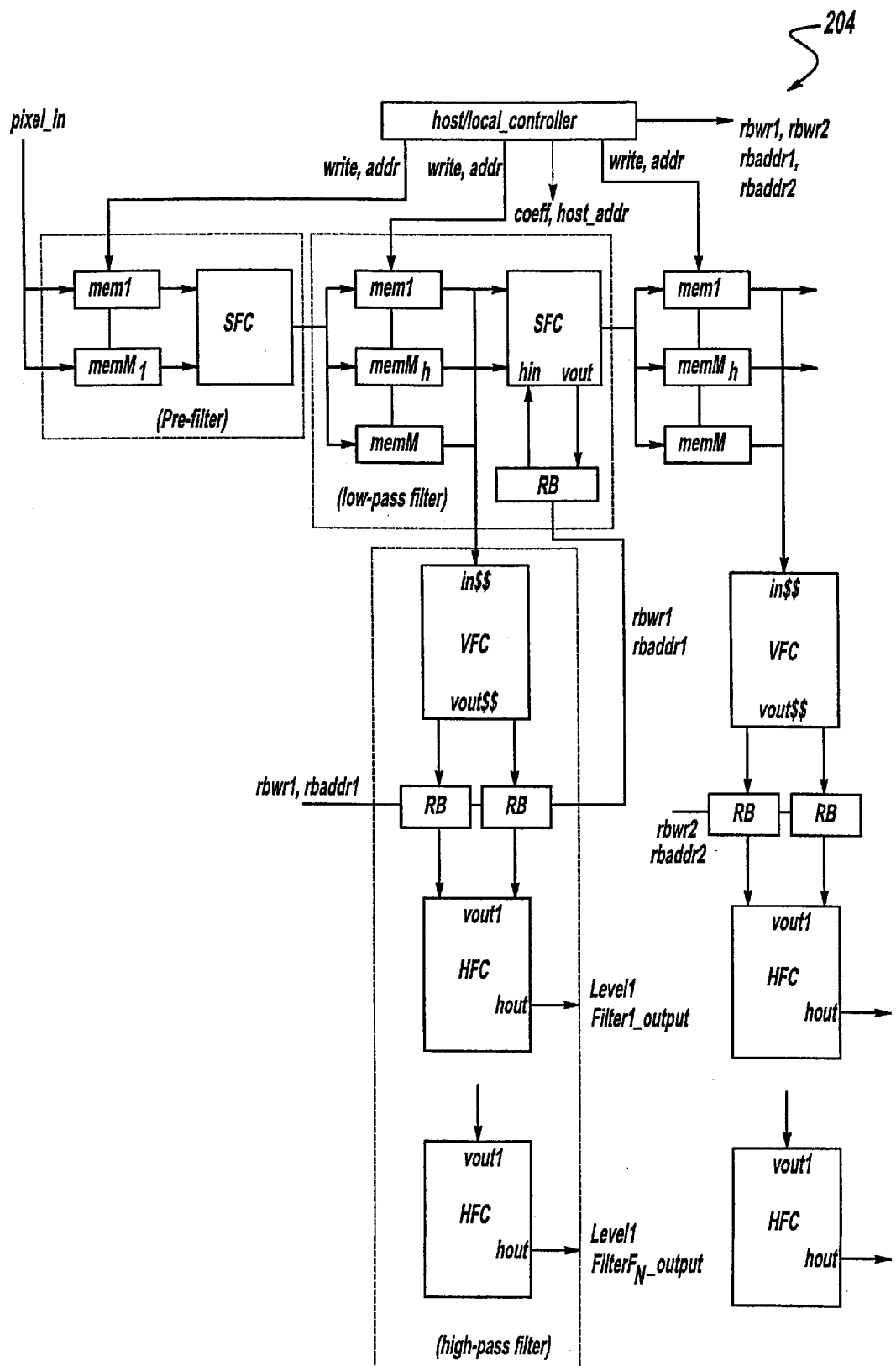
FIG. 25 illustrates a structure for a FSA+SWA undecimated system of the present invention.

The architecture for undecimated FSA+SWA is shown at 204 in FIG. 25.

Summary

SV/OSD

Two schemes may be used to perform a 1D filter operation; pipelined filtering and parallel filtering. For 2D separable filtering, the former is suitable for a filter whose direction aligns parallel to the input sequence, and the latter is suitable for a filter whose direction is perpendicular to the input sequence. Assuming the inputs are in a raster order, pipelined filtering is suitable for horizontal filtering, and parallel filtering is suitable for vertical filtering.

In order to make use of the implementation advantage of SV/OSD, the orthogonal filters have to be performed on an input image before the projection filters so that the outputs of the orthogonal filters can be shared among multiple sets of projection filters. In this case, the system requires $P(F_N+1)$ filters. If the filter order is reversed, the system requires $2PF_N$ filters. The amount of intermediate storage can be reduced to NM if the orthogonal filters are the vertical filters, and are performed before the projection filters which are horizontal filters.

Upon reading of the foregoing description, it should be appreciated that SV/OSD guarantees a linear convergence of the approximation. The approximation converges to the original filter as the approximation order approaches M. The speed of convergence typically is faster than linear convergence, and approaches exponential convergence.

SWA

Separable Wavelet Approximation (SWA) may be utilized for an efficient decimated MRD scheme. It is a combination of separable approximation and wavelet approximation. The amount of computation for an L level decomposition using the method is approximately $4F_N N^2 PM/3$, the throughput is $1/t_m$, the latency is approximately $2^{L-1}N(M_R+M)t_m$, and the amount of storage required is less than $N(M_I+2\max(M,M_2))$.

SWA can be modified to perform an undecimated MRD. The scheme employs an intermediate buffer called a reorder buffer, at the output end of each vertical filter, to provide a reordered input stream to the horizontal filter. The reorder buffer arranges the order of a pixel stream so that the horizontal filtering can be done using a pipelined filtering scheme. The size of each reorder buffer is N. The system requires $LF_N(P+1)+1$ reorder buffers and L reorder buffer address generators. The latency of the decomposition is the same as the decimated SWA case, which is approximately $2^{L-1}N(M_n+M)t_m$. The throughput is $1/t_m$, amount of computation is $2N^2M_I+2LN^2M_h+LN^2MP+LF_N N^2 MP=2N^2M_I+LN^2(2M_h+MP+F_N MP)$, and the amount of storage is $NM_I+LN\max(M,M_h)+NL(F_N P+1)$.

SWA uses a basic spline function as an interpolation filter. The length of the pre-filter and the low pass filter in SWA depend on the order of the basic spline. If a $k^{th}$ order basic spline is used, then the lengths of the pre-filter and the low pass filter are k and k+2 respectively. Based on performance evaluation, a basic spline of order 7 achieves a good performnance/computation trade-off.

Steerable Implementation

Fourier Series Approximation (FSA) exhibits a high degree of flexibility in the filter selection process, since the real and the imaginary parts are separate entities in the selection process. SV/OSD can be combined with FSA (FSA+SV/OSD) for an efficient steerable filter implementation with the throughput of the system being $1t_m$, the latency being O(NM), the amount of computation being $N^2(MQP+F_N)$, and the storage requirement being NM.

Also, FSA and SWA can be combined (decimated FSA+SWA) for an efficient decimated steerable MRD scheme, with the throughput of the system being $1/t_m$, the latency being $2^{L-1}N(M_R+M)t_m$, the amount of computation being $4N^2PQM/3$, and the storage requirement being $N(M_f+\max(M,M_h))$. FSA and SWA can be combined (undecimated FSA+SWA) for an efficient undecimated steerable MRD scheme, with the throughput of the system being $1/t_m$, the latency being $2^{L-1}N(M_R+M)t_m$, the amount of computation being $2N^2M_f+LN^2(2M_h+MP+MPQ)$, and the storage requirement being $NM_f+LN\max(M,M_h)+NL(PQ+1)$.

Hardware

Six VLSI architectures have been defined, including ones for (1) SV/OSD, (2) decimated MRD using SWA, (3) undecimated MRD using SWA, (4) FSA+SV/OSD, (5) a decimated steerable MRD using FSA+SWA, and (6) an undecimated steerable MRD using FSA+SWA. Each of these systems satisfies the four identified scalability criteria.

What is claimed is:

1. A method of processing video data, comprising the steps of:
   A. providing a processor for processing input pixel data;
   B. inputting filter parameters into said processor;
   C. computing a set of 2D filter coefficients having a specific orientation from said filter parameters;
   D. generating a single digital filter approximation matrix based on said computed filter coefficients; and
   E. decomposing said approximation matrix into a plurality of separable digital filters by utilizing a set of orthogonal filter coefficients for each of said plurality of filters that provides an optimal approximation of each of said plurality of filters; and
   F. increasing a dilation factor of said digital filters by a predetermined factor in order to generate an undecimated multi-resolution image decomposition output.

2. The method of claim 1, wherein said dilation factor comprises a 2×2 dilation factor.

3. The method of claim 1, further comprising the steps of:
   G. filtering pixel data;
   H. outputting said filtered pixel data;
   I. adjusting a dilation factor of said plurality of digital filters by a predetermined factor; and
   J. repeating steps A–I for N levels of decomposition, where N is a positive, nonzero integer.

4. The method of claim 1, further comprising the steps of:
   G. formulating a basic spline function to obtain pre-filter and low-pass filter coefficients; and
   H. approximating a set of 1D high-pass filters by decomposing said basic spline function into separable functions.

5. The method of claim 1, further comprising the step of increasing a decimation factor of said filtered data in conjunction with said step of increasing a dilation factor of the orientation filters to provide a decimated multi-resolution decomposition filter output.

6. The method of claim 1, wherein said step of increasing a dilation factor comprises:
   generating two-dimensional mother wavelet functions;
   decomposing the mother wavelet functions into separable one-dimensional functions;
   generating a basic spline function;
   generating a low-pass filter based on a spline order, associated with said basic spline order function; and
   approximating each of the separable one-dimensional filters in terms of said basic spline function to generate said plurality of digital filters.

7. The method of claim 6, wherein said step of approximating each of said separable one-dimensional functions comprises approximating each of said separable one-dimensional functions to generate interpolation, low-pass filters, and high-pass filters for recursive multi-resolution decomposition.

8. The method of claim 6, wherein said step of generating a basic spline function comprises the step of generating high pass filters in a horizontal orientation using the basic spline function given by the equations $$a_i(x) \approx \sum_j g_i^x[j]\Phi_1(x-j)$$

and generating high-pass filters in the vertical direction using $$b_i(y) \approx \sum_j g_i^y[j]\Phi_L(y-j)$$

where said above functions $(a_i, b_i)$ are derived from a mother function of dyadic wavelets decomposed into a separable fashion given by the equation:

$$\Psi_b(x,y) \approx \sum_i^P a_i(x)b_i(y)$$

9. The method of claim 1, wherein said step of decomposing comprises decomposing said approximation matrix into a plurality of sets of horizontal filters and at least one vertical filter that are implemented in a vertical-horizontal filtering scheme.

10. The method of claim 9, further comprising the step of inputting filtered data into a reorder buffer after the step of filtering the data through a vertical filter to minimize shift delay between the vertical and horizontal filters and to produce an undecimated filtered data output.

* * * * *